United States Patent
Raffaelli

(10) Patent No.: US 11,046,136 B2
(45) Date of Patent: Jun. 29, 2021

(54) FORECARRIAGE OF A ROLLING MOTOR VEHICLE WITH ROLLING BLOCK

(71) Applicant: PIAGGIO & C. S.p.A., Pisa (IT)

(72) Inventor: Andrea Raffaelli, Pisa (IT)

(73) Assignee: PIAGGIO & C. S.P.A., Pisa (IT)

( * ) Notice: Subject to any disclaimer, the term of this patent is extended or adjusted under 35 U.S.C. 154(b) by 184 days.

(21) Appl. No.: 16/472,231

(22) PCT Filed: Dec. 20, 2017

(86) PCT No.: PCT/IB2017/058220
§ 371 (c)(1),
(2) Date: Jun. 21, 2019

(87) PCT Pub. No.: WO2018/116211
PCT Pub. Date: Jun. 28, 2018

(65) Prior Publication Data
US 2021/0129610 A1    May 6, 2021

(30) Foreign Application Priority Data

Dec. 21, 2016    (IT) .................. 102016000129489

(51) Int. Cl.
*B62K 5/08*    (2006.01)
*B62K 5/10*    (2013.01)
(Continued)

(52) U.S. Cl.
CPC ............ *B60G 5/04* (2013.01); *B60G 21/005* (2013.01); *B62K 5/08* (2013.01); *B62K 5/10* (2013.01)

(58) Field of Classification Search
CPC ........ B60G 21/005; B62K 5/04; B62K 5/025; B62K 5/02; B62K 5/08; B62K 5/10
See application file for complete search history.

(56) References Cited

U.S. PATENT DOCUMENTS 9,211,773 B2    12/2015  Kitamura
9,238,494 B2    1/2016   Iizuka
(Continued)

FOREIGN PATENT DOCUMENTS

CN    201670311 U    12/2010
CN    109552513 A *  4/2019
(Continued)

OTHER PUBLICATIONS

International Search Report for corresponding application PCT/IB2017/058219 filed Dec. 20, 2017; dated Apr. 9, 2018.
(Continued)

*Primary Examiner* — Paul N Dickson
*Assistant Examiner* — Maxwell L Meshaka
(74) *Attorney, Agent, or Firm* — Cantor Colburn LLP

(57) ABSTRACT

The present invention relates to a forecarriage of a rolling motor vehicle with three or four wheels, comprising: a forecarriage frame (16); at least one pair of front wheels (10', 10") kinematically connected to each other and to the forecarriage frame (16) by a kinematic roll mechanism (20) which enables the same to roll in a synchronous and specular manner; a roll block system (100) comprising a rod (110) which directly connects to each other at the two ends thereof by means of ball joints or hinging means equivalent to ball joints (101, 102), two parts of the forecarriage both subject to rolling movements of said two front wheels or said forecarriage frame and a forecarriage part subject to said rolling movements. The roll block system comprises a blocking device (111a, 112a; 130) adapted to block the rotation angle of said rod at the two ends thereof with respect to a rolling plane of said forecarriage.

17 Claims, 11 Drawing Sheets

(51) Int. Cl.
  *B60G 5/04*   (2006.01)
  *B60G 21/00*  (2006.01)

(56) References Cited

U.S. PATENT DOCUMENTS

| | | |
|---|---|---|
| 2005/0167174 A1 | 8/2005 | Marcacci |
| 2006/0226628 A1 | 10/2006 | Lindsay |
| 2006/0255550 A1 | 11/2006 | Pfeil |
| 2008/0238005 A1 | 10/2008 | James |
| 2013/0119629 A1* | 5/2013 | Lee .................. B60G 3/00 280/124.117 |
| 2013/0161919 A1 | 6/2013 | Gaillard-Groleas |
| 2015/0158360 A1 | 6/2015 | Uebayash |
| 2015/0210338 A1* | 7/2015 | Iizuka ................ B62K 21/18 280/267 |
| 2015/0246704 A1 | 9/2015 | Takano et al. |
| 2015/0329165 A1 | 11/2015 | Page |
| 2016/0229249 A1 | 8/2016 | Mori |
| 2016/0229480 A1 | 8/2016 | Mori |
| 2017/0106930 A1 | 4/2017 | Hara et al. |
| 2018/0086168 A1 | 3/2018 | Iguchi |
| 2018/0086169 A1 | 3/2018 | Igichi |
| 2018/0265157 A1 | 9/2018 | Hara |
| 2019/0264906 A1 | 8/2019 | Takahashi |
| 2019/0375262 A1 | 12/2019 | Raffaelli |
| 2019/0375476 A1 | 12/2019 | Raffaelli |

FOREIGN PATENT DOCUMENTS

| | | | | |
|---|---|---|---|---|
| EP | 2345576 A1 | 7/2011 | | |
| EP | 2810861 A1 | 12/2014 | | |
| EP | 2899107 A1 | 7/2015 | | |
| FR | 2953184 A1 | 6/2011 | | |
| GB | 2537387 A | * | 10/2016 | ............. B62K 5/02 |
| WO | 2010054894 A1 | 5/2010 | | |
| WO | 2015146660 A1 | 10/2015 | | |
| WO | 2015146679 A1 | 10/2015 | | |
| WO | WO-2015146660 A1 | * | 10/2015 | ............. B62J 99/00 |
| WO | WO-2015146679 A1 | * | 10/2015 | ............. B62K 5/08 |

OTHER PUBLICATIONS

International Search Report for corresponding application PCT/IB2017/058220 filed Dec. 20, 2017; dated Apr. 9, 2018.
International Search Report for corresponding application PCT/IB2017/058221 filed Jun. 28, 2018; dated Apr. 9, 2018.
International Search Report for corresponding application PCT/IB2017/058223 filed Dec. 20, 2017; dated Sep. 4, 2018.
International Search Report for corresponding application PCT/IB2017/058224 filed Dec. 20, 2017; dated Apr. 9, 2018.
Written Opinion for corresponding application PCT/IB2017/058220 filed Dec. 20, 2017; dated Apr. 9, 2018.
Written Opinion for corresponding application PCT/IB2017/058223 filed Dec. 20, 2017; dated Sep. 4, 2018.
Written Opinion for corresponding application PCT/IB2017/058224 filed Dec. 20, 2017; dated Apr. 9, 2018.
Written Opinion of the International Searching Authority for corresponding application PCT/IB2017/058219 filed Dec. 20, 2017; dated Apr. 9, 2018.
Written Opinion for corresponding application PCT/IB2017/058221 filed Jun. 28, 2018; dated Apr. 9, 2018.

* cited by examiner

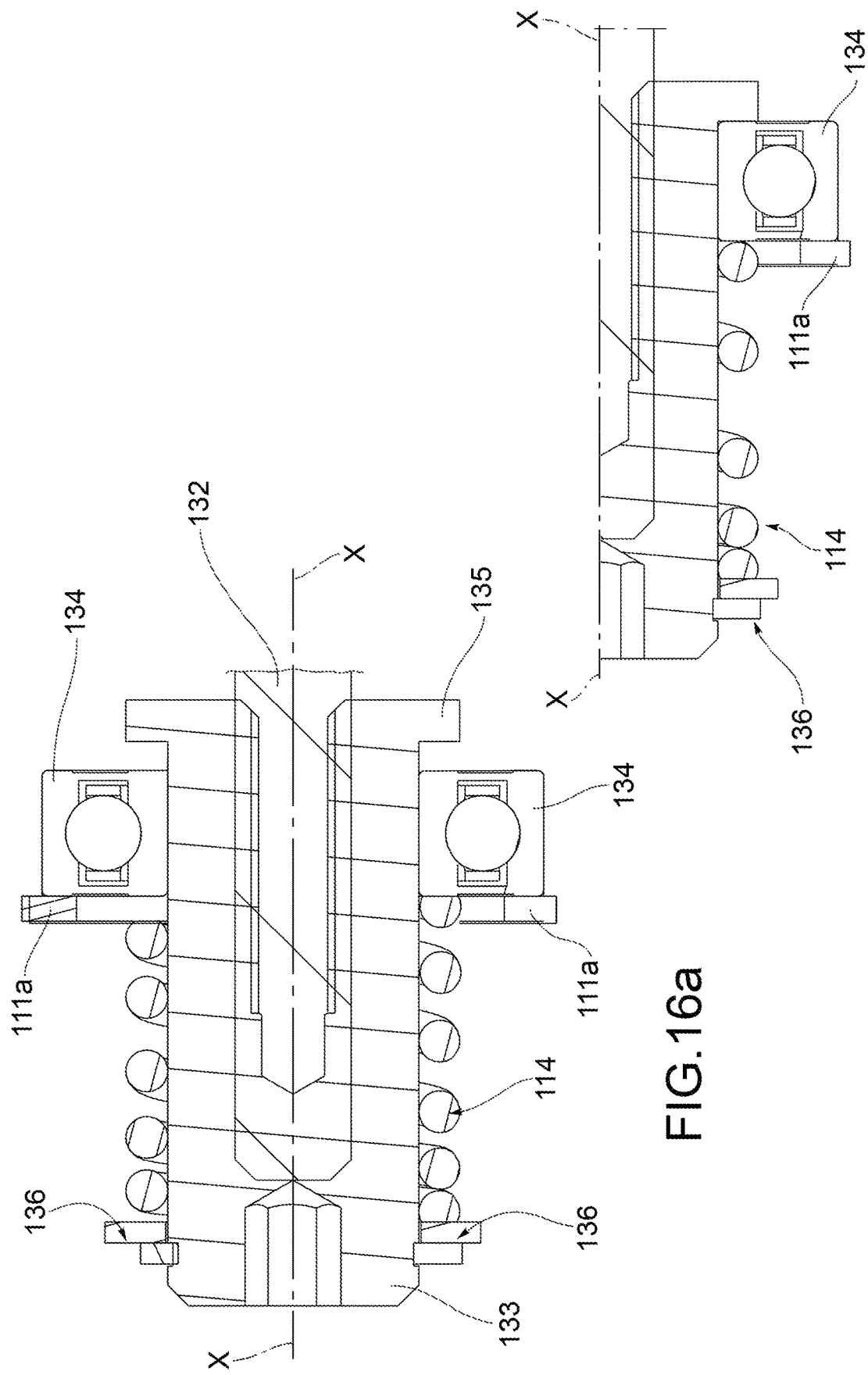

FORECARRIAGE OF A ROLLING MOTOR VEHICLE WITH ROLLING BLOCK

FIELD OF APPLICATION

The present invention relates to a forecarriage of a rolling motor vehicle with rolling block. In particular, the vehicle according to the invention may be a motor vehicle provided with two steering and rolling wheels at the front and a rear drive wheel with fixed axle at the rear.

PRIOR ART

In the field of motor vehicles there is a growing supply of "hybrid" vehicles that combine the characteristics of motorcycles, in terms of handling, with the stability of four-wheeled vehicles.

These "hybrid" vehicles are represented, for example, by three-wheeled motor vehicles provided with two front steering wheels and, by four-wheeled motor vehicles known as QUAD.

More specifically, the above three-wheeled motor vehicles are provided with two steering and rolling (i.e. tilting) wheels at the front and a rear drive wheel with fixed axle at the rear. The rear wheel is intended to provide the drive torque and thus allow traction while the front wheels, paired, are intended to provide the directionality of the vehicle. The paired wheels at the forecarriage in addition to steering can tilt and roll. Due to this solution, compared to three-wheeled motor vehicles of which two at the rear, the motor vehicles with two wheels at the forecarriage are equivalent to an actual motorcycle since, just like a motorcycle, the motor vehicle can tilt on bends. Compared to a two-wheeled motor vehicle, such vehicles with two paired wheels at the forecarriage have, however, increased stability ensured by the double support on the ground of the front wheels, similar to that provided by a car.

The front wheels are kinematically connected together by means of kinematic mechanisms that enable the same to roll in a synchronous and specular manner, for example through the interposition of articulated quadrilaterals. These vehicles are further provided with two independent suspensions, one for each of the two front wheels, provided with dampers, also independent.

Three-wheel rolling motor vehicles are therefore designed to provide the handling of a two-wheeled motorcycle and, at the same time, the stability and safety of a motor vehicle with four wheels.

A three-wheeled rolling motor vehicle of this type is described, for example, in the Italian patent application no. IT2003MIA001108 by the same Applicant.

Due to the structural features of this type of vehicles, it is possible that under certain conditions, for example at very low speeds or during stops, the motor vehicle may fall as a result of an accidental and/or uncontrolled roll movement.

This problem has been addressed by providing the above vehicles with rolling block systems, operated by the user manually and/or by an automatic control system.

The roll block can be obtained in a variety of ways, but all substantially sharing the reversible block of a component that is configured to follow the rolling movements of one or both rolling wheels. The blocking of the rolling movements of such a component determines kinematically, directly or indirectly, the blocking of the rolling of the two front wheels of the motor vehicle.

The component to be reversibly blocked can be an element that is already present in the rolling structure of the motor vehicle. For example, according to a very popular solution, the component to be blocked can be an element of the articulated quadrilateral that defines the rolling kinematic mechanism, preferably one of the two uprights. The blocking of the movement of an upright of the quadrilateral prevents the latter from varying its configuration and, therefore, indirectly the two wheels from rolling. If the articulated quadrilateral is connected to the axle journals of the two rolling wheel through the interposition of the suspensions, the roll movements due to asymmetric spring movements of the dampers are excluded from such a block and they will need to be managed independently.

Such a system is described, for example, in the Italian patent application no. IT2004A000171 by the same Applicant. The roll block system is described in relation to a rolling motor vehicle provided with a steering system with articulated quadrilateral structure and two independent front suspensions. The roll block system comprises: a mechanical clamp adapted to block the rotation of the upper upright of the articulated quadrilateral around the hinge connecting the upright to the frame; two hydraulic clamps operated simultaneously by an electric motor acting on rods placed in parallel to the dampers to also prevent the roll due to an asymmetrical spring movement of two wheels.

Alternatively, the component to be reversibly blocked to block the roll can consist of an element that is added to the rolling structure of the motor vehicle and is specifically designed for this purpose.

In particular, this additional element may be associated with the articulated quadrilateral, as a reversible blocking element on the configuration of the quadrilateral itself. This solution is described, for example, in the European patent application EP2810861A1, in the French patent FR2953184 and in the European patent EP2345576B1.

Alternatively, this additional element may consist of a direct interconnection element between the axle journals of two rolling wheels, mechanically released from the frame of the motor vehicle. "Axle journal" of a wheel is the mechanical part of the motor vehicle intended to support the rotation pin of the wheel itself and interconnected it kinematically to the suspensions, the steering device and, in the specific case, to the kinematic roll mechanism. The axle journal can be kinematically integral with the wheel pin, which in turn supports the wheel through bearings. In that case, the axle journal may be made integral with the wheel pin or be mechanically constrained thereto to form one piece. The axle journal can be kinematically integral with the wheel pin, which in turn supports the wheel through bearings. This technical solution of roll blocking—as kinematically released from the effects induced by the suspensions—allows blocking all the roll movements by acting only on such an additional element, thus including the roll movements generated by an asymmetrical spring movement of two rolling wheels. Such a technical solution is the object of the Italian patent application no. 102015000088087 by the same Applicant. A particular roll block system described in that application consists of an extensible rod that connects at the two ends thereof the two axle journals of the front wheels directly to each other by hinging means equivalent to a ball joint. The roll blocking is achieved by blocking the angle of rotation of the rod on the rolling plane at at least one end thereof by means of a dedicated actuator, such as a band brake or a drum brake. The rod so locked prevents the rolling movements of the two wheels. "Rolling plane" means a plane transverse to the longitudinal direction or direction of travel of the motor vehicle, and thus incident the centre line plane of the motor vehicle.

Alternatively, the above additional element may consist of a direct interconnection element between the axle journal of one of the two rolling wheels and the frame of the motor vehicle. Such a technical solution is described in the Italian patent application no. 102015000088091 by the same Applicant. In particular, the roll block system consists of an extensible rod that connects at the two ends thereof the axle journal of one of the wheels directly to the frame by hinging means equivalent to a ball joint. The roll blocking is achieved by blocking the angle of rotation of the rod with respect to the rolling plane at at least one of the two ends thereof by means of a dedicated actuator, such as a band brake or a drum brake. The rod so locked prevents the rolling movements of the two wheels. In this case, the rolling movements caused by the asymmetrical spring suspension of both wheels are not blocked, since the springing of the wheel not connected to the frame by the rod is not affected by the rod block itself.

In general, a roll block system, based on an interconnection rod that is hinged at its ends by hinging means equivalent to a ball joint and whose angle of rotation on the rolling plane is lockable a at least one end thereof by means of a dedicated actuator has the great advantage compared to other solutions to be easily installed on motor vehicles, and to require per se a limited footprint.

Moreover, such a rod can be extensible or not in length, depending on whether it connects points the distance whereof varies or not during the movements of the motor vehicle (in particular, roll, steering or asymmetric spring suspension). The system can therefore also be easily configured in such a way as to be substantially transparent when driving.

The adoption of belt or drum brakes also allows integrating the actuators directly on the hinging means of the rod, with advantages in terms of ease of installation.

Such a technical solution, however, has the limit of requiring the use of power actuators, having a size sufficient to provide sufficient torque not only to maintain balance in the motor vehicle by blocking the rolling movements thereof, but also to prevent such a balance from being modified by moving all the weight of the motor vehicle on one side. A single actuator must be able to provide torques in the range of 30 kgm. This requires the installation of belt or drum brakes of large size, which effectively annul the space-saving advantage given by the rod. A similar situation would occur also if disc brakes are used.

This limit is also greatly accentuated in case one wants to block the rotation of the rod at both ends to symmetrise the blocking of the roll on the two rolling wheels. In such a case, it would therefore be necessary to install not one, but two actuators, with a doubling of the overall dimensions and costs. A symmetric blocking of the roll is not in itself essential because the two wheels are connected to each other by the kinematic roll mechanism, but it may be suitable to annul the chain of tolerances and elasticity of the components.

A possible alternative to the belt brake or drum brake consists of an extensible strut which in the vicinity of the hinging area diagonally connects the rod to the element to which it is hinged, as described in the already cited Italian patent application no. 102015000088087. The extensible strut is provided with means adapted to block the extension in length thereof. When locked in length, the strut prevents the rod from rotating. This technical solution, however, requires more complicated installation and does not allow significantly reducing the problem of the overall dimensions.

There is therefore the need to develop a rolling motor vehicle provided with a roll block system which, while adopting a rod lockable at one end as a roll blocking element, allows overcoming in whole or in part the limits set forth above.

DISCLOSURE OF THE INVENTION

Therefore, the object of the present invention is to eliminate or at least reduce, the above drawbacks of the prior art by providing a forecarriage of a rolling motor vehicle provided with a roll block system that allows combining the simple installation of a rod as a roll blocking element with a small footprint of the system as a whole.

A further object of the present invention is to provide a forecarriage of a rolling motor vehicle provided with an roll block system which allows using actuators that are smaller and more cost-effective than those of the prior art.

A further object of the present invention is to provide a forecarriage of a rolling motor vehicle provided with a roll block system which allows making the blocking of the roll of both rolling wheels symmetrical without causing an increase in the overall dimensions of the system and relative costs.

A further object of the present invention is to provide a forecarriage of a rolling motor vehicle provided with a roll block system that is constructively simple and cost-effective to be made and mount on the vehicle itself.

DESCRIPTION OF THE DRAWINGS

The technical features of the invention can clearly be seen in the content of the claims below, and its advantages will become more readily apparent in the detailed description that follows, made with reference to the accompanying drawings, which illustrate one or more embodiments thereof which are purely exemplary and non-limiting, in which:

FIGS. 16A and 16B schematically show a detail of FIG. 9, relative to an elastic means and a locking bushing, illustrated respectively in two different operating positions.

DETAILED DESCRIPTION

Figure 1:
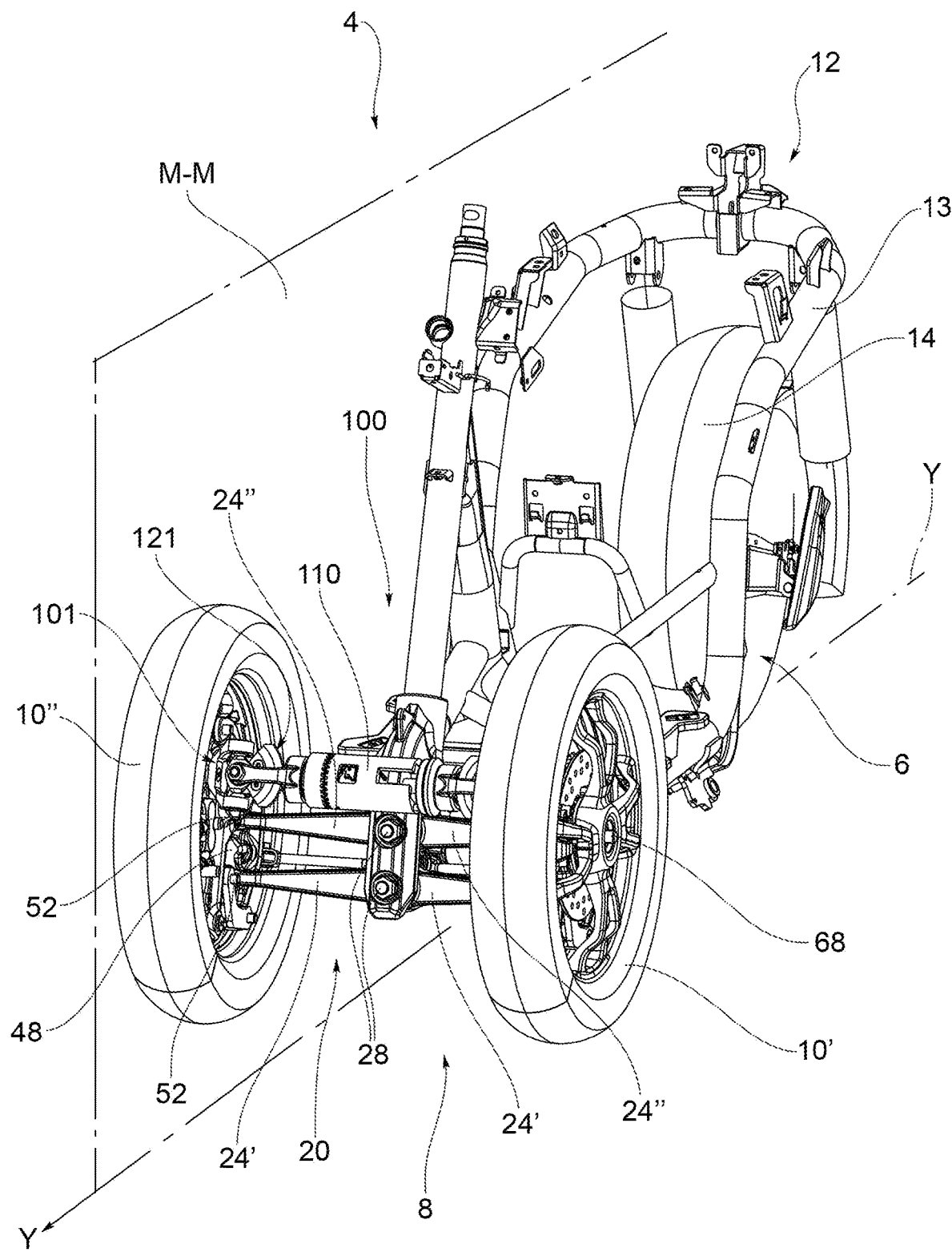
FIG. 1 shows a perspective view of a motor vehicle provided with a forecarriage with roll block system according to preferred embodiment of the invention, illustrated with some parts removed to better show others.
Figure 2:
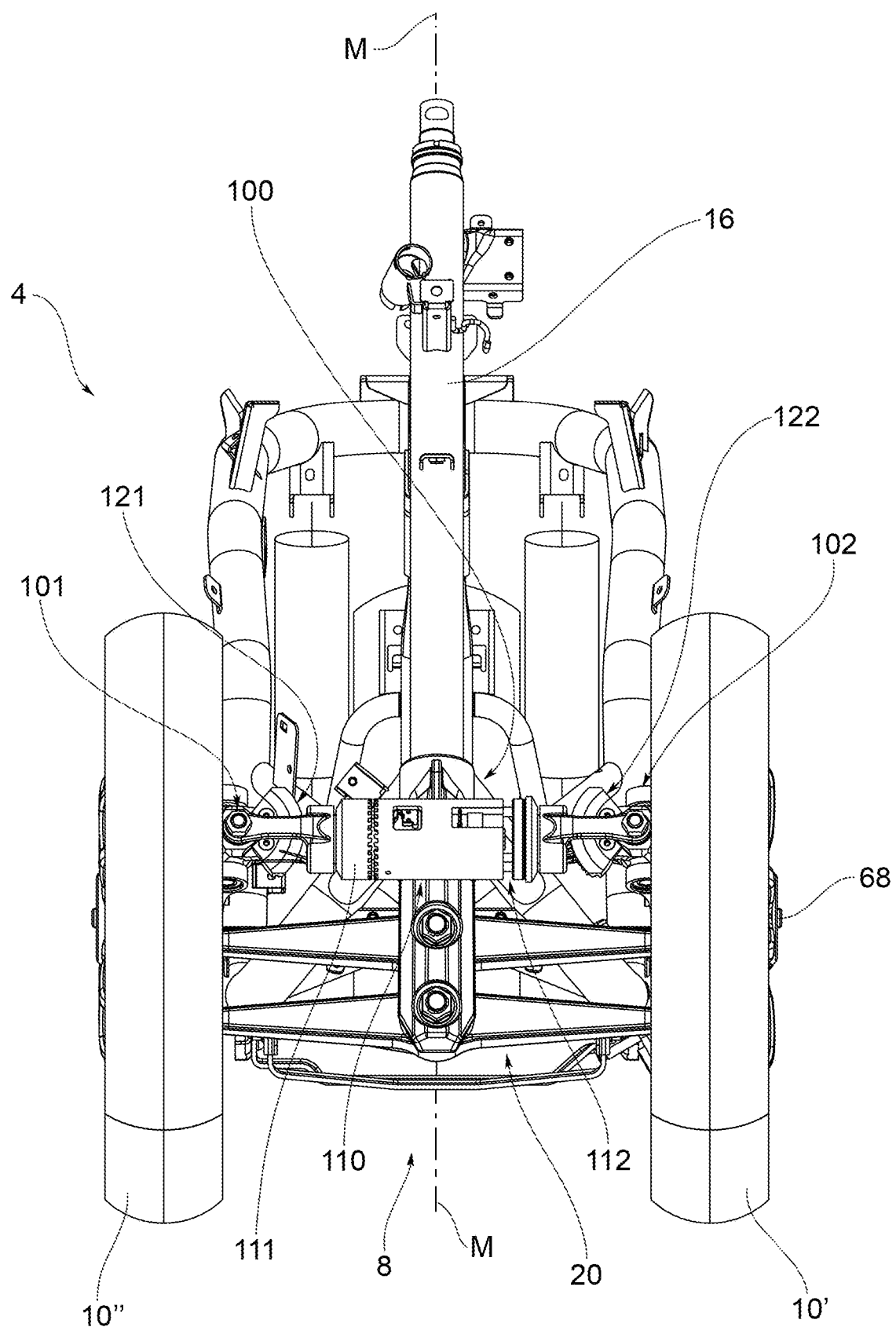
FIG. 2 shows a front orthogonal view of the motor vehicle shown in FIG. 1.
Figure 3:
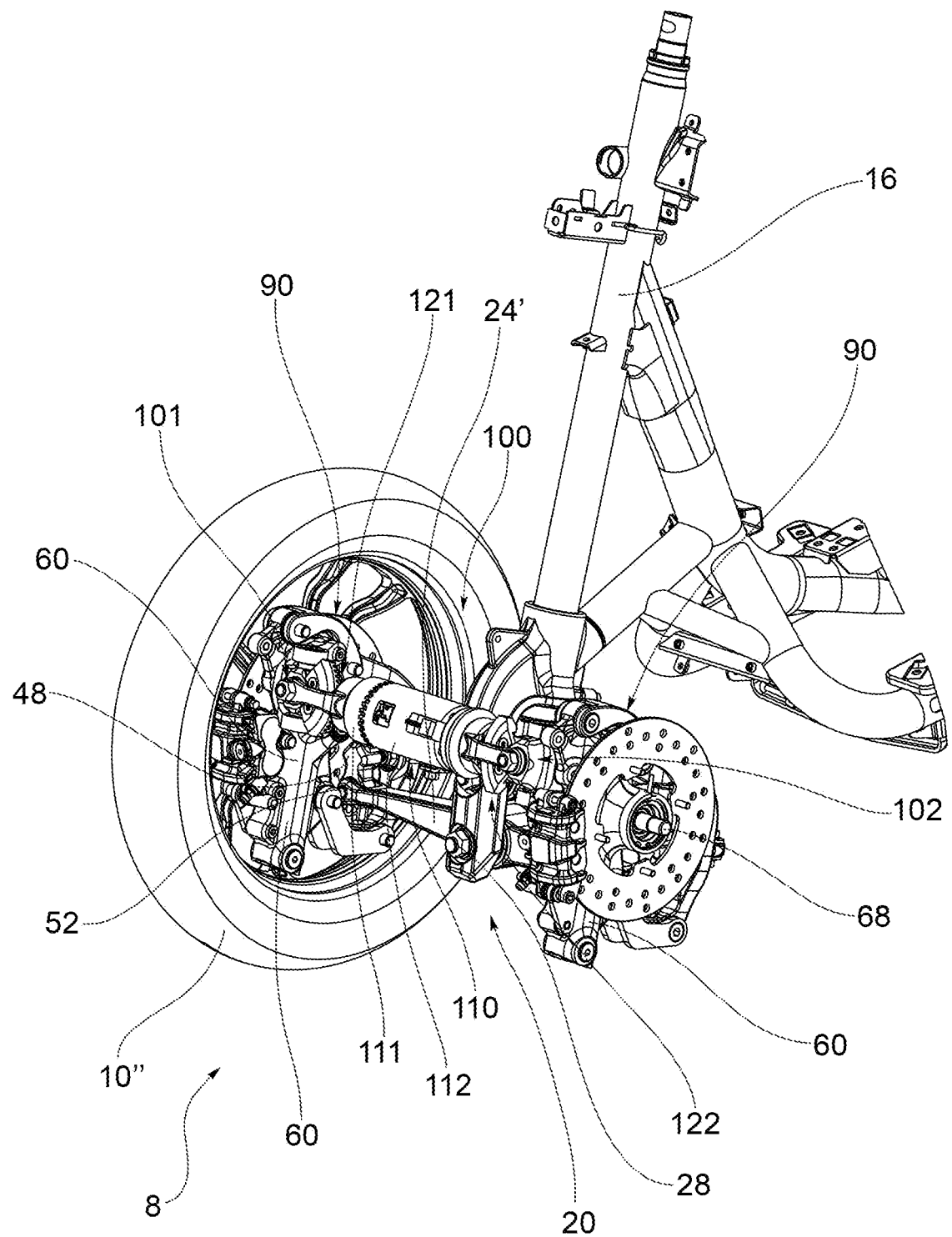
FIG. 3 is a lateral perspective view of the forecarriage of the motor vehicle in FIG. 1 shown without one of the two front wheels.

With reference to the above figures, reference numeral 4 globally denotes a motor vehicle according to the present invention.

For the purposes of this invention, it should be noted that the term motor vehicle must be considered in a broad sense, encompassing any motor vehicle having at least three wheels, i.e. two front wheels, as better described below, and at least one rear wheel. Therefore, the definition of motor vehicle also encompasses the so-called quads, with two wheels at the forecarriage and two wheels at the rear.

The motor vehicle 4 comprises a frame 6 extending from a forecarriage 8 supporting at least two front wheels 10, to a rear 12 supporting one or more rear wheels 14. It is possible to distinguish a left front wheel 10' and a right front wheel 10", wherein the definition of left and right wheel 10', 10" is purely formal and means in relation to a driver of the vehicle. Said wheels are arranged to the left and right of a centre line M-M of the motor vehicle, with respect to an observation point of a driver driving the same.

For the purposes of the present invention, frame 6 of the motor vehicle may have any shape, size and may for example be of the lattice type, the box-like type, single or dual cradle and so on. Frame 6 of the motor vehicle may be in one piece or in multiple parts; for example, frame 6 of the motor vehicle is interconnected with a rear frame 13 which may comprise a rear oscillating swingarm (not shown) supporting one or more rear drive wheels 14. The above rear swingarm may be connected to frame 6 by direct hinging, or by the interposition of crank mechanisms and/or intermediate frames.

According to a general embodiment solution of the present invention, the motor vehicle forecarriage 8 comprises a forecarriage frame 16 and a pair of front wheels 10',10" kinematically connected to each other and to the forecarriage frame 16 by means of a kinematic roll mechanism 20 which enables the same to roll in a synchronous and specular manner.

The motor vehicle forecarriage 8 comprises a rolling block system 100 in turn comprising a rod 110 which connects directly to one another at the two ends thereof by means of ball joints or hinging means equivalent to ball joints 101,102:
two parts of the forecarriage, both subject to roll movements of said two front wheels; or
said forecarriage frame 16 and a part of the forecarriage subject to said roll movements.

The above roll block system 100 further comprises a blocking device 111a, 112a, 130 adapted to block the angle of rotation of said rod 110 at the two ends thereof with respect to a rolling plane of said forecarriage.

"Rolling plane" means a plane transverse to the longitudinal direction or direction of travel Y of the motor vehicle, and thus incident the centre line plane M-M of the motor vehicle. Operatively, block the rotation of rod 110 at the two ends thereof with respect to the roll plane means blocking the roll movements of the forecarriage parts connected to rod 110 and thus consequently blocking the roll movements of the two front wheels 10', 10".

According to a preferred embodiment shown in the accompanying Figures, each front wheel 10', 10" is connected to said first kinematic mechanism 20 by a respective axle journal 60, which is mechanically connected to a rotation pin 68 of the wheel so as to support it rotatably around an axis of rotation. The forecarriage further comprises suspension means 90 to guarantee each axle journal 60 at least one spring suspension movement with respect to said rolling kinematic mechanism 20.

"Axle journal" of a wheel is the mechanical part of the motor vehicle intended to support the rotation pin of the wheel itself and interconnected it kinematically to the suspensions, the steering device and the above first kinematic mechanism 20. The axle journal can be kinematically integral with the wheel pin, which in turn supports the wheel through bearings. In that case, the axle journal may be made integral with the wheel pin or be mechanically constrained thereto to form one piece. The axle journal can be kinematically integral with the wheel pin, which in turn supports the wheel through bearings.

According to this preferred embodiment illustrated in the accompanying Figures, the above two parts of the forecarriage 8 both subject to roll movements of the two front wheels and directly connected by said rod 110 are the axle journals 60 of the two front wheels 10', 10". In this case, the blocking of the rotation of rod with respect to said rolling plane determines the block of the rolling movements of the axle journals of both two front wheels, and thus of the two wheels themselves.

Alternatively, according to an embodiment not illustrated in the accompanying figures, said rod 110 may connect the axle journal of only one of the two front wheels directly to the forecarriage frame 16. In this case, the blocking of the rotation of the rod with respect to said rolling plane occurs only at a front wheel. Operatively, the blocking of the roll of a single front wheel, however, also automatically determines the rolling block of the other front wheel, due to the kinematic interconnection imposed by the above kinematic roll mechanism.

Preferably, in both embodiments, which provide the connection of rod 110, respectively, to one or both axle journals, the hinging means 101, 102 equivalent to ball joints consist of a pair of cylindrical hinges with axes orthogonal to each other. A first hinge 101', 102' of said pair has the hinge axis thereof substantially orthogonal to the rolling plane of the two front wheels 10', 10" and can be defined as "roll hinge", while the second hinge 101", 102" of said pair has a hinge axis parallel to the rolling plane and is functional to allow steering movements to the axle journal and can be called "steering hinge".

The above kinematic roll mechanism 20 may have any configuration provided that it is preferably functional to ensure the front wheels to roll in synchronous and specular manner. According to the embodiment illustrated in the accompanying Figures, the kinematic roll mechanism 20 is an articulated quadrilateral system.

More in detail, such an articulated quadrilateral system comprises a pair of cross members 24', 24", hinged to the forecarriage frame 16 at middle hinges 28. The cross members 24', 24" are connected to each other, at opposite transverse ends by means of uprights 48 pivoted at said transverse ends at side hinges 52. The cross members 24', 24" and uprights 48 define the above articulated quadrilateral 20.

Preferably, in this case, each of the uprights 48 guides and supports axle journal 60 of one of said front wheels 10', 10".

According to an embodiment not illustrated in the accompanying Figures, each upright can guide and support the axle journal of the respective front wheel coaxially to a prevailing extension axis thereof. In this case, the suspension means of each front wheel are integrated into the respective upright and ensure a rectilinear spring motion of the axle journal along the prevailing extension axis of the upright.

Alternatively, as illustrated in the accompanying Figures, the articulated quadrilateral kinematic roll mechanism 20 can be implemented in such a way that each of the uprights 48 guides and supports the axle journal 60 of the respective front wheel 10', 10" externally to itself via a kinematic connection system of the roto-translational type Advantageously, according to an embodiment not illustrated in the accompanying Figures, when the kinematic roll mechanism is an articulated quadrilateral system, the above two parts of the forecarriage 8 both subject to roll movements of said two front wheels and connected directly by said rod 110, may be two components selected from the uprights and the cross members of said articulated quadrilateral system. Operatively, the blocking of the rotation of rod 110 with respect to the rolling plane determines the blocking of the articulated quadrilateral configuration, and then as a result of the rolling movements that are allowed by such an articulated quadrilateral system.

Alternatively, according to a further embodiment not illustrated in the accompanying figures, said rod 110 may connect a component selected from the uprights and the cross members of said articulated quadrilateral system directly to the forecarriage frame 16.

Preferably, in both the above embodiments, which provide the connection of rod 110, respectively, between two components of the articulated quadrilateral or between one of such components and the forecarriage frame, the hinging means 101, 102 equivalent to ball joints may simply consist of a single cylindrical hinge having the hinge axis thereof substantially orthogonal to the rolling plane of the two front wheels 10', 10". The articulated quadrilateral is in fact always parallel to said rolling plane in all its different configurations and is transparent to the steering movements, such as the forecarriage frame.

Advantageously, forecarriage 8 is provided with a steering device adapted to control the rotation of the axle journals about respective steering axes of each front wheel 10', 10". The steering device may act directly on the axle journals and be subject to the action of the suspensions, or act indirectly on the axle journals without being subject to the action of the suspensions.

Preferably, said rod 110 comprises a first portion 111 of rod and a second portion 112 of rod, which are interconnected with each other along a longitudinal extension axis X of rod 110 itself and can each rotate around such a longitudinal extension axis X independently of one another.

The first 111 and the second portion 112 of rod 110 are kinematically connected to the respective ball joint 101, 102 (or the respective hinging means equivalent to a ball joint) through transmission means 121, 122 adapted to convert a rotational motion of the a ball joint 101, 102 around an axis orthogonal to said rolling plane into a rotation motion of the respective rod portion 111, 112 around said longitudinal extension axis X.

Operatively, these transmission means 121, 122 thus convert a rolling movement of a rod portion 111, 112 (i.e., a rotational motion of the ball joint 101, 102 around an axis orthogonal to said rolling plane) into an axial rotation motion of said rod portion 111, 112.

Preferably, the transmission means 121, 122 of said first 111 and said second rod portion 112 are configured in such a way that said first and second portion 111 of rod 112 rotate axially in opposite directions relative to one another in the presence of rolling movements of the forecarriage.

Preferably, such transmission means 121, 122 also have a transmission ratio of not less than 1.

Preferably, said blocking device 111a, 112a, 130 adapted to block the angle of rotation of said rod 110 at the two ends thereof with respect to a rolling plane of said forecarriage 8 comprises, on each of said first 111 and second rod portion 112, a respective first 111a and second 112a head element.

The first 111a and second 112a head element are rotationally integral with the respective first 111 and second rod portion 112 and are arranged facing each other.

Figure 8:
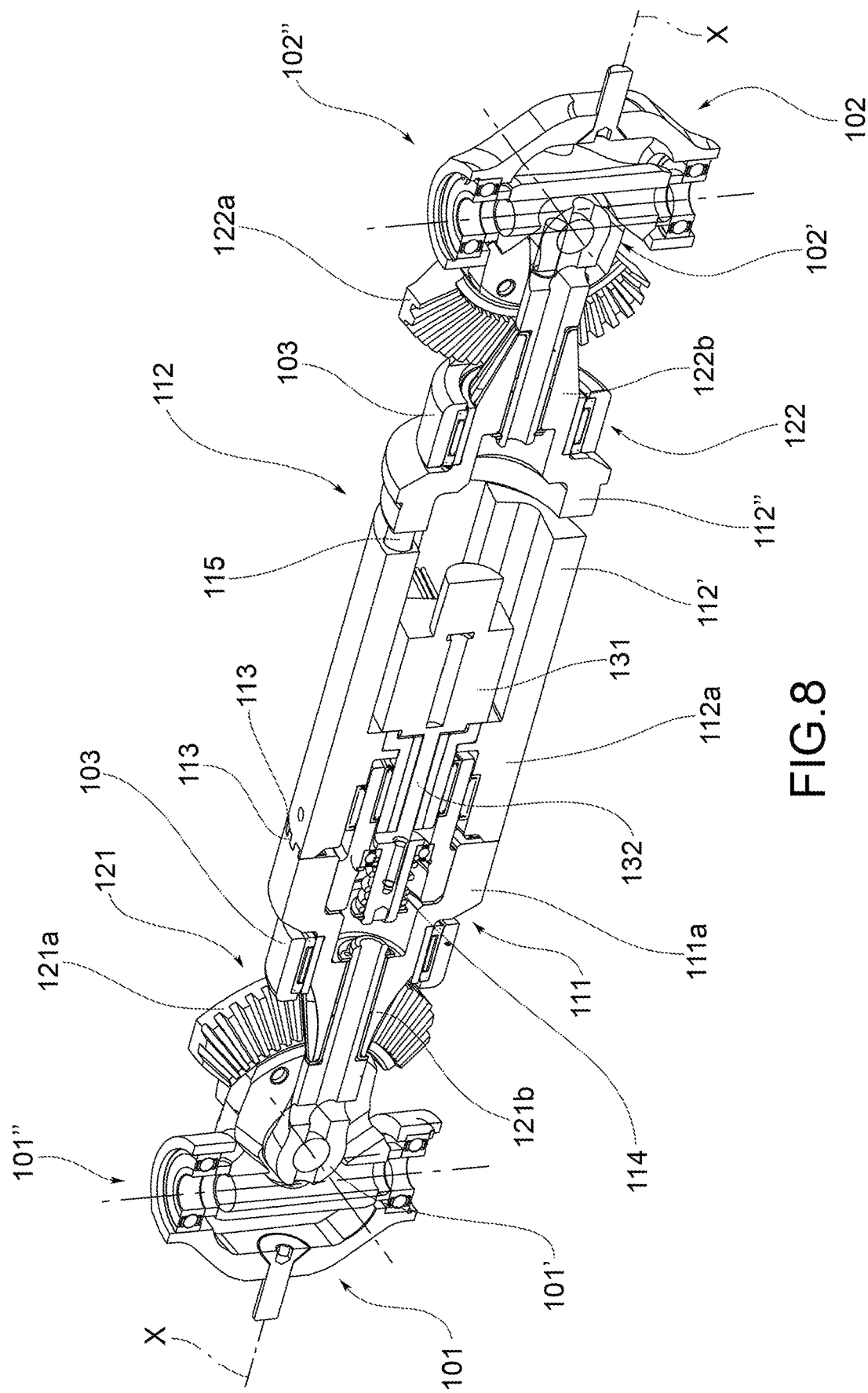
FIGS. 8 and 9 respectively show an enlarged perspective view and orthogonal view of a longitudinal section of the forecarriage component in FIG. 4 shown without wheels.
Figure 9:
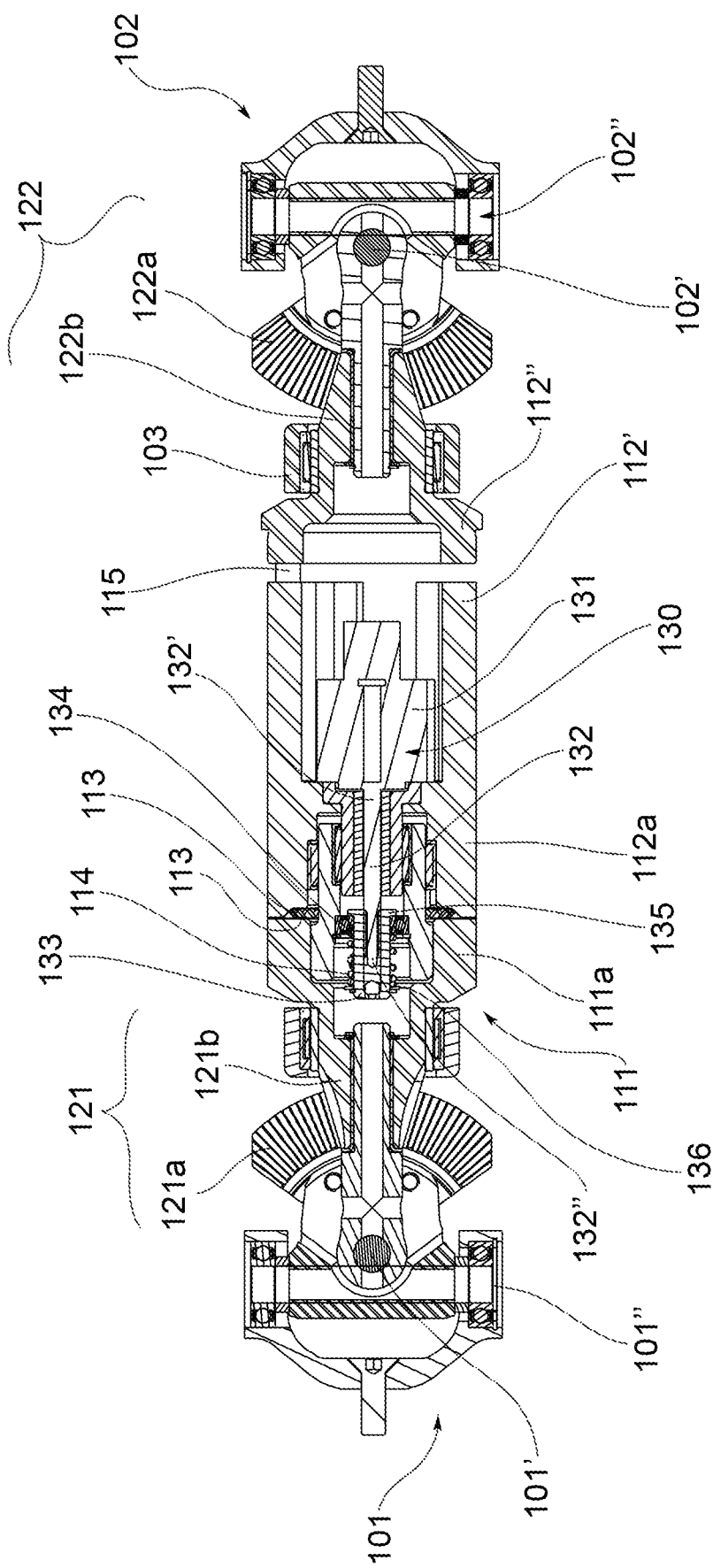
Figure 10:
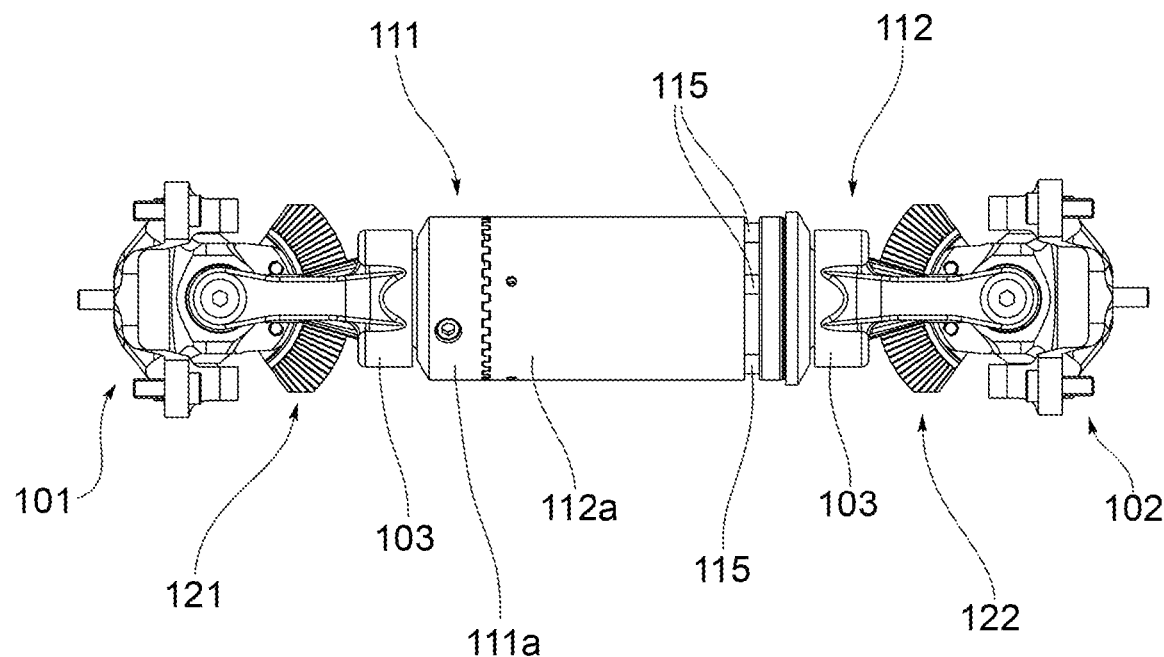
FIG. 10 shows an orthogonal view of the detail of the component in FIG. 4 shown without wheels with the blocking device illustrated in the blocked position.
Figure 11:
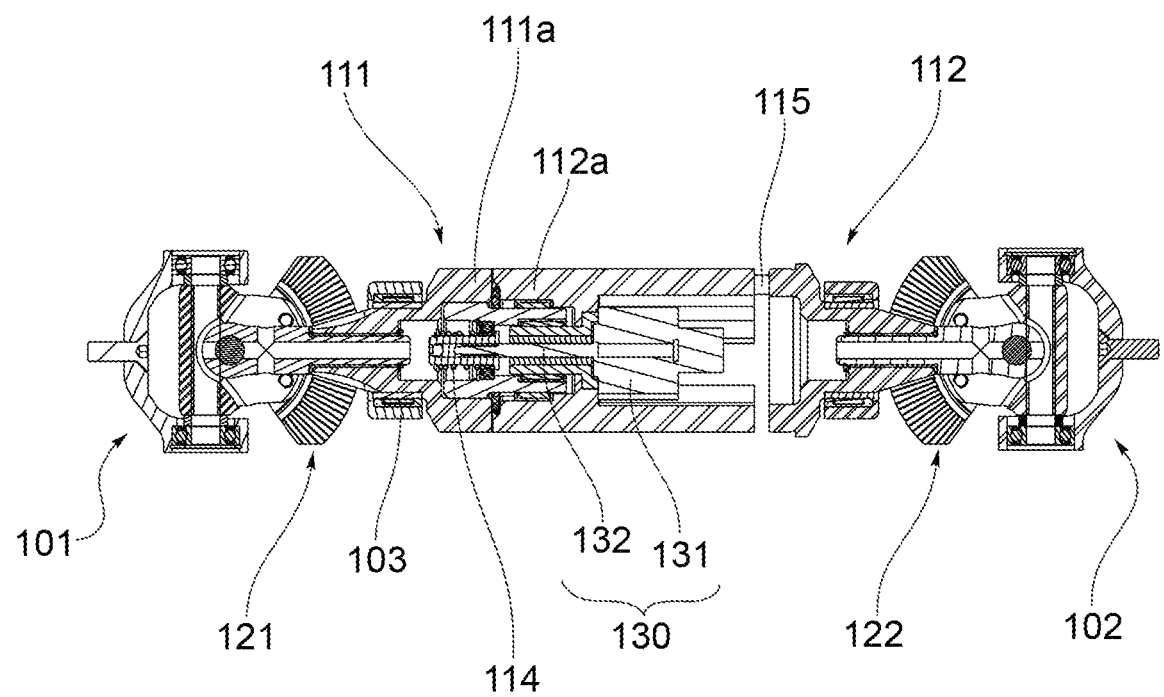
FIG. 11 shows an orthogonal longitudinal section view of the component in FIG. 10.
Figure 12:
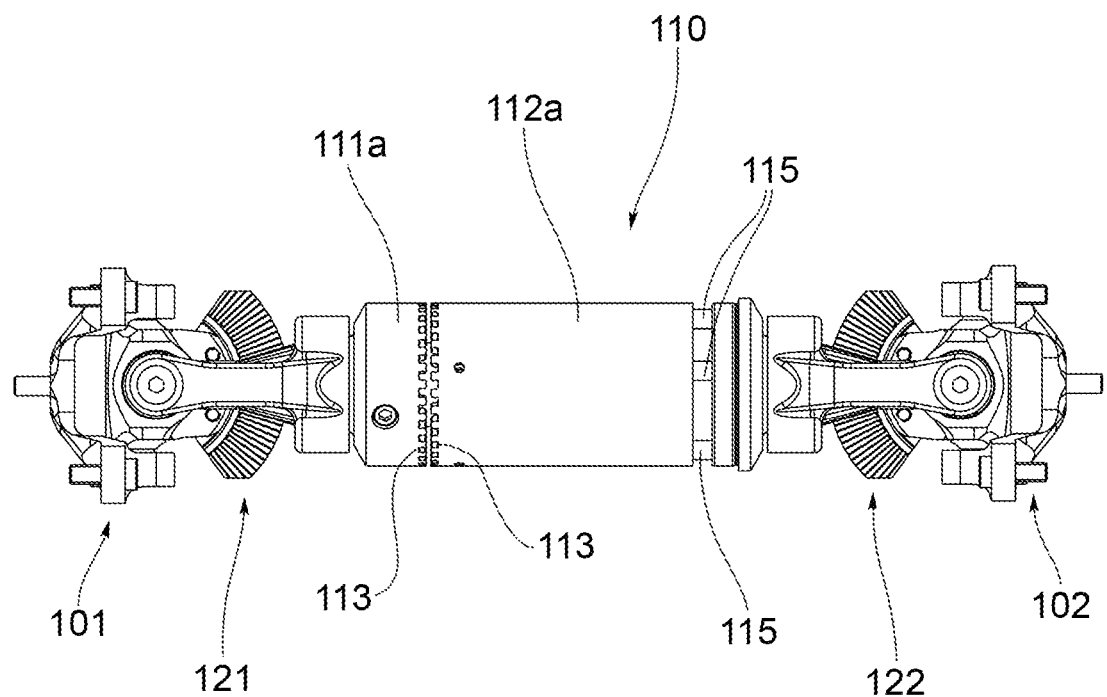
FIG. 12 shows an orthogonal view of the detail of the component in FIG. 4 shown without wheels with the blocking device illustrated in the released position.
Figure 13:
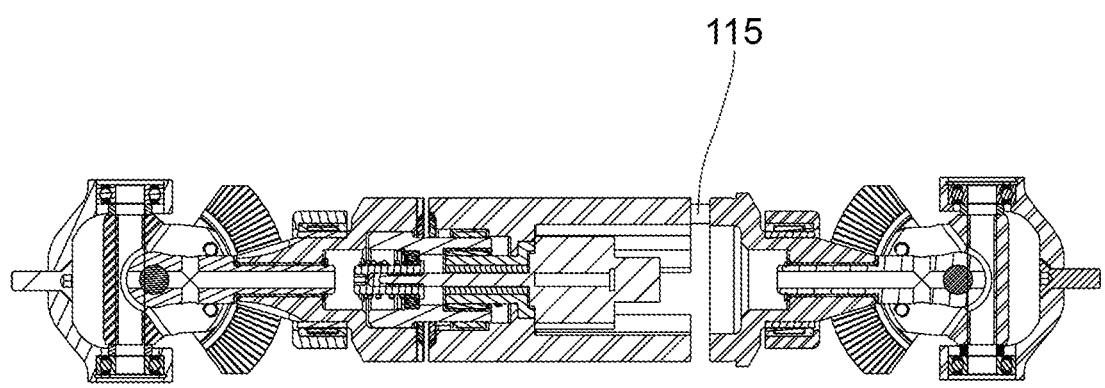
FIG. 13 shows an orthogonal longitudinal section view of the component in FIG. 12.
Figure 14:
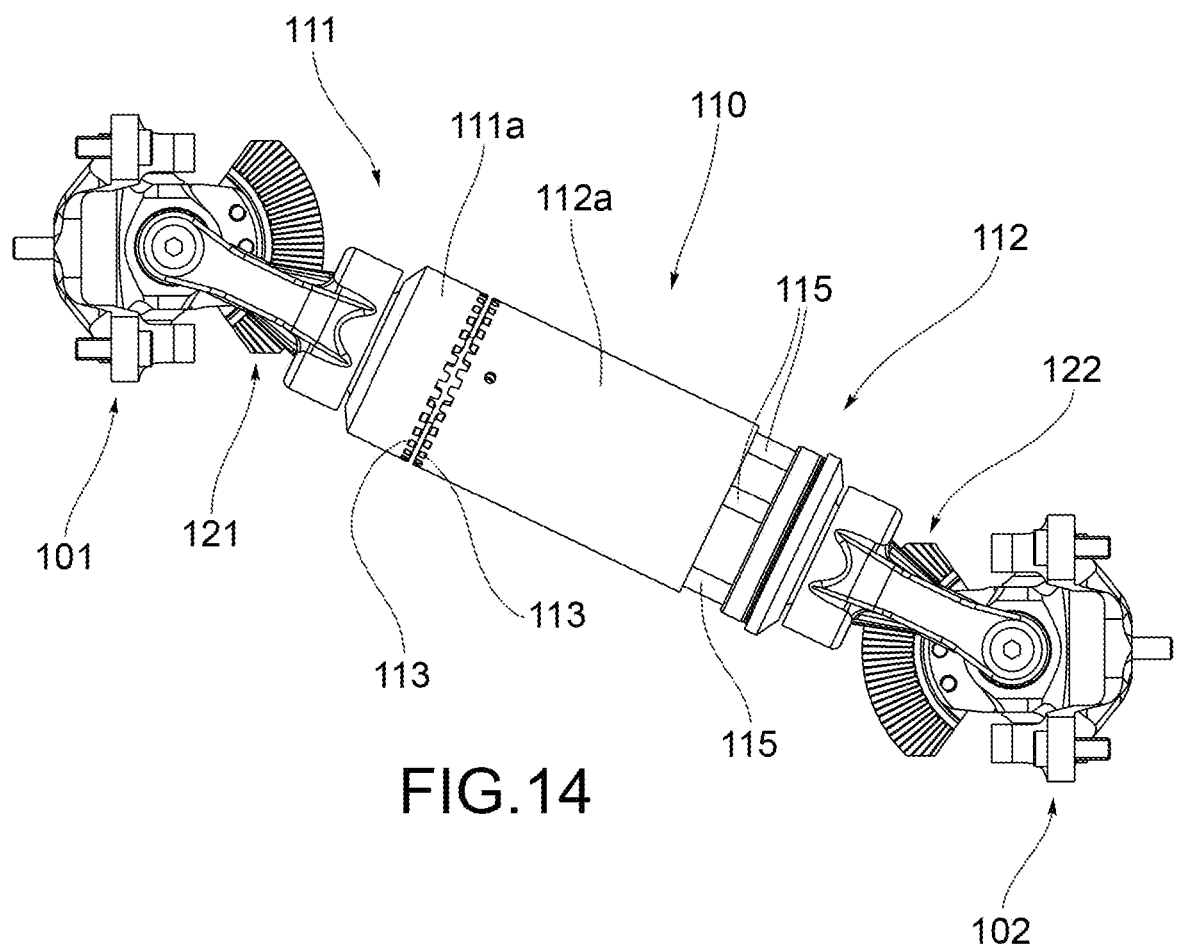
FIG. 14 shows an orthogonal view of the detail of the component in FIG. 5 shown without wheels with the blocking device illustrated in the released position.
Figure 15:
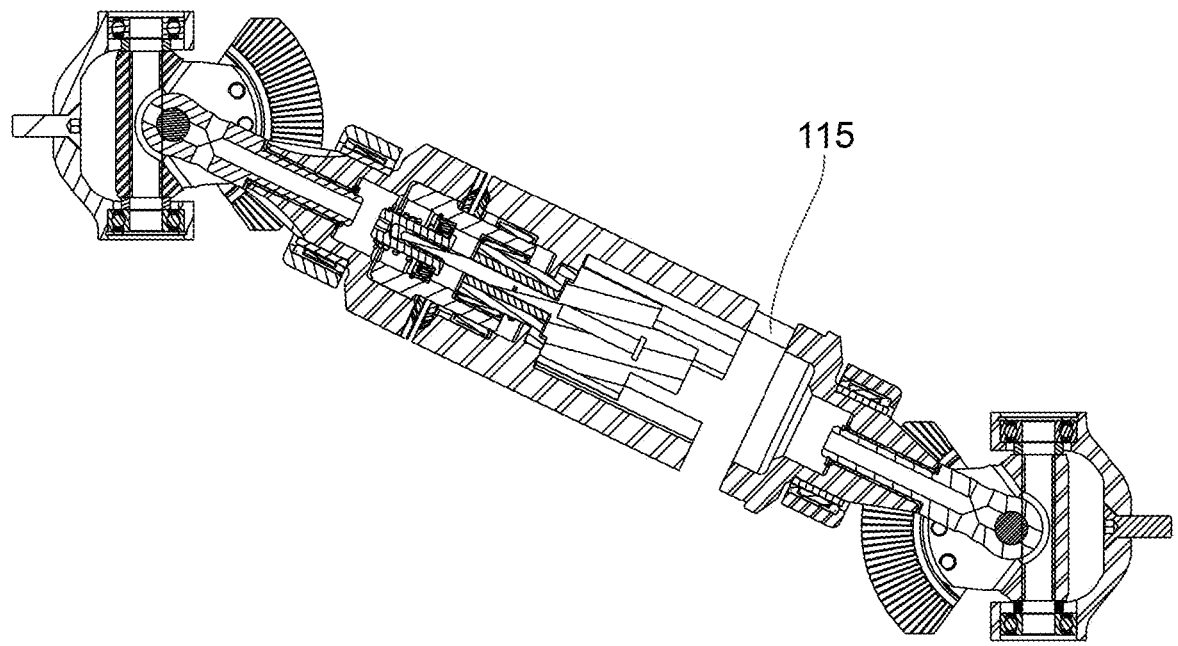
FIG. 15 shows an orthogonal longitudinal section view of the component in FIG. 14.

According to the embodiment illustrated in particular in FIGS. 8 and 9, each of said first 111a and second 112a head element are shaped, in particular, as a collar or a flange coaxial to the respective rod portion 111, 112. Preferably, the collar or flange is dimensioned so as not to protrude radially with respect to the profile of the respective first 111 and second rod portion 112, in order to not increase the overall dimensions of rod 110.

Preferably, the second head element 112a of the second rod portion 112 is movable along the longitudinal axis of extension X of rod 110 to move between:
  a blocking position, wherein said second head element 112a engages in mutual locking the first head element 111a so as to make the first 111 and the second rod portion 112 rotationally integral to prevent the rotation thereof and thus block the rolling movements through the above transmission means 121, 122; and
  a release position, wherein the second head element 112a is longitudinally separated from the first head element 111a so as to leave the first 111 and the second rod portion 112 free to rotate without interfering with the rolling movements.

The above blocking device 111a, 112a, 130 also comprises an actuator 130 adapted to move said second head element 112a between said blocking position and said release position.

Compared to traditional blocking systems, with an equal power to provide for blocking the roll at an end of the rod, the invention allows the use of significantly lower power actuators and therefore characterized by more limited overall dimensions.

The power P that is necessary to provide to an end of rod 110 to block the roll is defined as $P = M \times \omega$, where M is the block of torque applied by the blocking actuator and $\omega$ is the angular velocity to which the rod end is subject, meant as the variation of the rolling angle in the time unit.

In traditional systems, torque M that the actuator must apply is therefore equal to power P divided by the angular velocity $\omega$, the latter being equivalent to the variation of the rolling angle in the time unit.

In the system according to the invention, the torque M that the actuator must apply is equal to power P divided by the angular velocity $\omega$ which, however, is not equivalent to the rolling angle variation, but to the relative axial rotational speed between the two rod portions 111, 112, and in particular between the two head elements 111a, 112a. Assuming a transmission ratio equal to 1 (as will be seen below, preferably, the transmission ratio is selected greater than 1), the axial rotation speed of each rod portion 111, 112 (and of the relative head element 111a, 112a) is substantially equal to the variation of the rolling angle in the time unit. Since the two rod portions are counter-rotating, the relative axial rotation speed is given by the sum of the two axial rotation speeds and can therefore be assumed to be equal to at least twice the variation of the rolling angle in the time unit. It follows that at equal power P, the torque M that the actuator must apply for the block is halved. This allows adopting actuators of at least halved power compared to traditional systems, with a consequent reduction also of the size and dimensions of the actuators themselves.

From the foregoing, the rolling block system according to the invention thus allows combining the simple installation of a rod as a roll blocking element with a small footprint of the system as a whole. It is in fact possible to use actuators having a significantly smaller size than those required by traditional systems. The size reduction of the actuators has as a consequence not only a reduction of the overall dimensions, but also of costs.

Functionally, as it is structured, the above blocking device 111a, 112a, 130 blocks the angle of rotation of rod 110 at the same time at both ends of the rod itself with respect to a rolling plane of said forecarriage.

Differently, the traditional roll block systems discussed in the introductory part allow the blocking at only one end of the rod. The blocking of the other end is a kinematic consequence ensured by the presence of the kinematic roll mechanism. A symmetrical blocking at both ends of the rod not entrusted to the presence of the kinematic roll mechanism would instead require a duplication of the blocking devices with increase of the overall dimensions and costs of the system.

In the specific case in which rod 110 is placed to connect the axle journals of the two front wheels 10', 10", the roll block system according to the invention therefore allows symmetrizing the roll blocking of both front rolling wheels without requiring any duplication of the blocking devices and thus without causing an increase in the overall dimensions of the system and the related costs.

Preferably, said transmission means 121, 122 have a transmission ratio greater than 1, so as to have a multiplication of the motion from the ball joints 102, 102 (or means equivalent to ball joints) to the respective first 111 and second portion 112 of rod 110. In this way, as the transmission ratio increases, the relative axial rotation speed ω between the two portions 111, 112 of rod 110 (and between the respective head elements 111a, 112a) increases and consequently, the blocking torque M that the actuator must apply is reduced.

For example, by selecting a transmission ratio equal to 4 for both rod portions 111, 112, at equal power P and rolling angle variation per time unit, the relative axial rotation speed ω is multiplied by a factor of 8 and torque M that the actuator must apply is reduced by a ratio equal to 8.

The transmission means 121, 122 may be any type, provided that they carry out the previously defined function and can provide a transmission ratio of not less than 1.

Preferably, as shown in the accompanying figures, said transmission means 121 consist, for each of said two first 111 and second portion 112 of rod 110, of a helical-bevel gear pair 121a, 121b and 122a, 122b. In fact, a helical-bevel gear, while requiring an adjustment of the clearances, may provide transmission ratios greater than 1.

More in detail, a first component 121a, 122a of each helical-bevel gear pair is kinematically associated with the corresponding ball joint 101, 102 (or hinging means equivalent to ball joints) so as to transmit only rolling movements, while a second component 121b, 122b of each helical-bevel gear pair is rotationally constrained to the respective rod portion 111, 112 (coaxially to the longitudinal axis X) to transmit to the latter a movement of rotation which in turn is generated by the rotation of the first component 121a, 122a, in case of roll.

According to the embodiment illustrated in particular in FIGS. 1 to 5, wherein rod 110 is placed in connection of the axle journals of the two front wheels, the hinging means 101, 102 equivalent to ball joints consist of a pair of cylindrical hinges with axes orthogonal to each other. A first hinge 101', 102' of said pair ("roll hinge") has the hinge axis thereof substantially orthogonal to the rolling plane of the two front wheels 10', 10", while the second hinge 101", 102" of said pair ("steering hinge") has a hinge axis parallel to the rolling plane and is functional to allow any steering movements.

The first hinge 101', 102' (roll hinge) is mechanically supported by the second hinge 101', 102" (steering hinge). In turn, the second hinge 101', 102" (steering) is connected to a part of the forecarriage, which in the specific case illustrated in the accompanying Figures is the axle journal of a front wheel. In the case in which the second hinge (steering) 101", 102" is not necessary, the first hinge 101', 102' (roll hinge) can be connected directly to a part of the forecarriage.

As shown in particular in FIGS. 6 to 9, each of said first and second portion 111 of rod 112 is associated with the respective first hinge 101', 102" ("roll hinge") by means of a bearing 103 coaxial with the longitudinal axis of development X of rod 110, in such a way that each rod portion 111, 112 can rotate around its own longitudinal axis X with respect to the respective first hinge 101', 102".

The first component 121a, 122a of each bevel gear pair is kinematically rigidly coupled to the first hinge 101', 102' (roll hinge), while the second component 121b, 122b of each bevel gear pair is rotationally constrained to the respective rod portion 111, 112 (coaxially to the longitudinal axis X) so as to transmit its rotational movement thereto which in turn is generated by the rotation of the first component 121a, 122a in case of roll.

As shown in the accompanying Figures, the first components 121a, 122a of each bevel gear pair are arranged on the same side of rod 110 with respect to the longitudinal axis X of the rod itself. In this way, a rolling movement of equal direction and width imposed by the hinging means 101, 102 at both opposite ends of rod 110 causes—due to the two bevel gear pairs—an axial rotation in the opposite direction of the two portions 111 and 112 of rod 110 and of the two head elements 111a, 112a thereof.

Preferably, the interconnection between the first 111 and the second portion 112 of rod 110 along the longitudinal axis of extension X of the rod itself is implemented between the first head element 111a and the second head element 112a and is obtained by an axial interpenetration between such two head elements 111a and 112a. The interposition of one or more bearings ensures the axial sliding and the free relative rotation between the two portions 111 and 112 of the rod and of the relative head elements 111a and 112a, as shown in particular in FIGS. 8 and 9.

As already mentioned above, the second head element 112a of the second rod portion 112 is movable along the longitudinal axis of extension X of rod 110 to move between said blocking position and said release position.

Advantageously, the second head element 112a is mounted to slide axially with respect to the second rod portion 112 so as to be freely moved axially between the release position and the blocking position without influencing or being influenced by the second rod portion 112.

Advantageously, the second head element 112a can be axially coupled to the second rod portion 112 via any means allowing an axial sliding between the two parts, while preventing a relative rotation about the longitudinal axis X of rod 110.

According to the embodiment illustrated in the accompanying Figures, the second head element 112a is slidably coupled in the axial direction to the second rod portion 112 via a plurality of drive pins 115 parallel to the longitudinal axis X of the rod. Alternatively, a coupling via a splined shaft may for example be provided.

Figure 4:
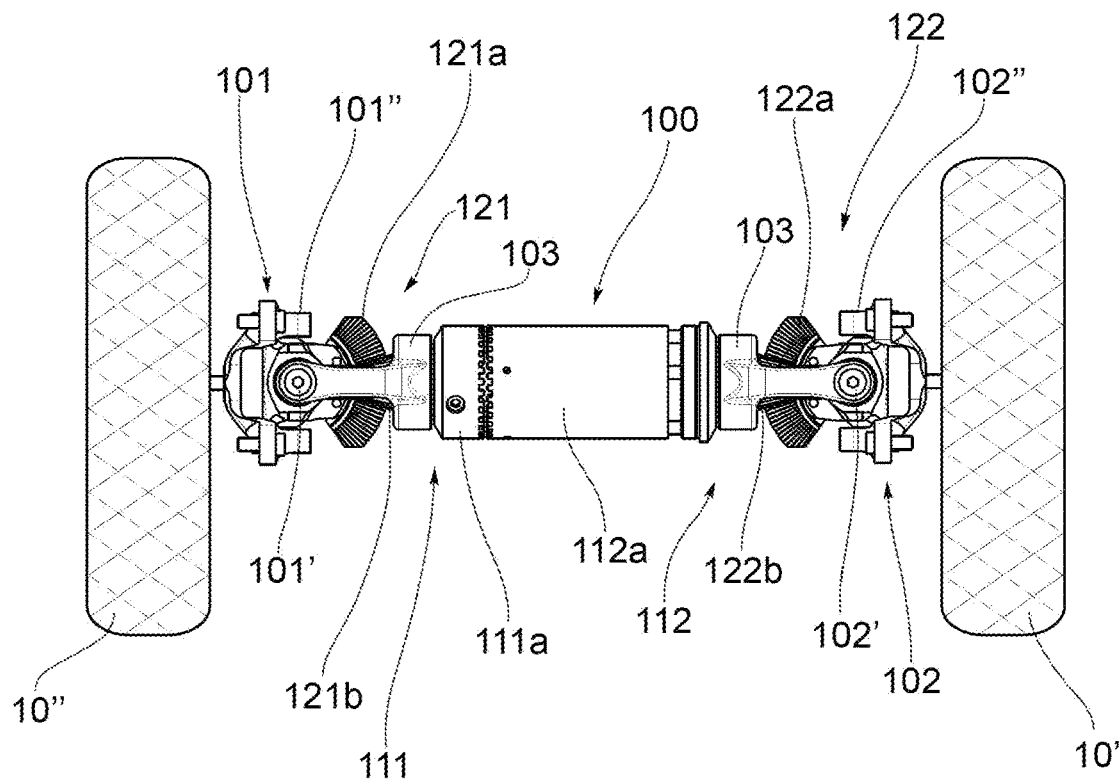
FIGS. 4 and 5 show a part of the forecarriage shown in FIGS. 1 to 3 in which a forecarriage component is visible, consisting of a rod which connects the axle journals of the two front wheels at the two ends thereof by means of hinging means equivalent to ball joints and transmission means shown, respectively, in a base position and in a position taken as a result of a rolling movement.
Figure 5:
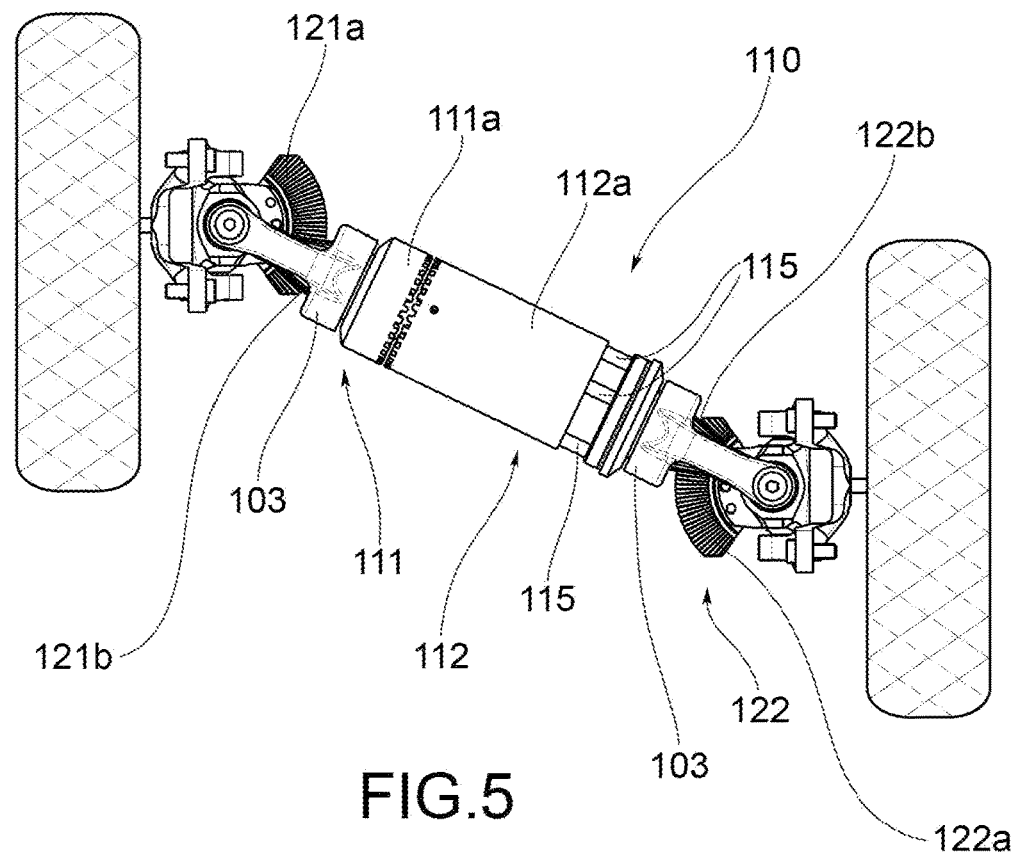
Figure 6:
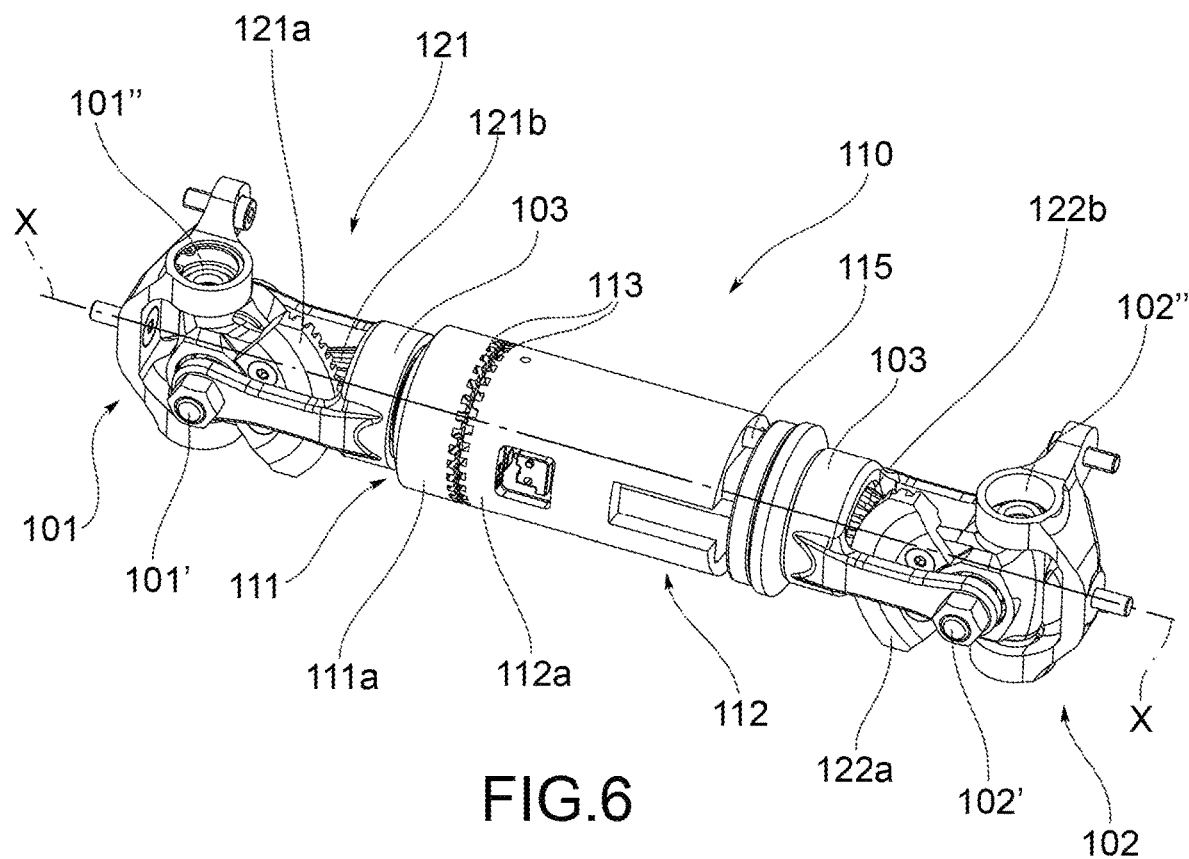
FIGS. 6 and 7 show two perspective views of the forecarriage component in FIG. 4 shown without the wheels.
Figure 7:
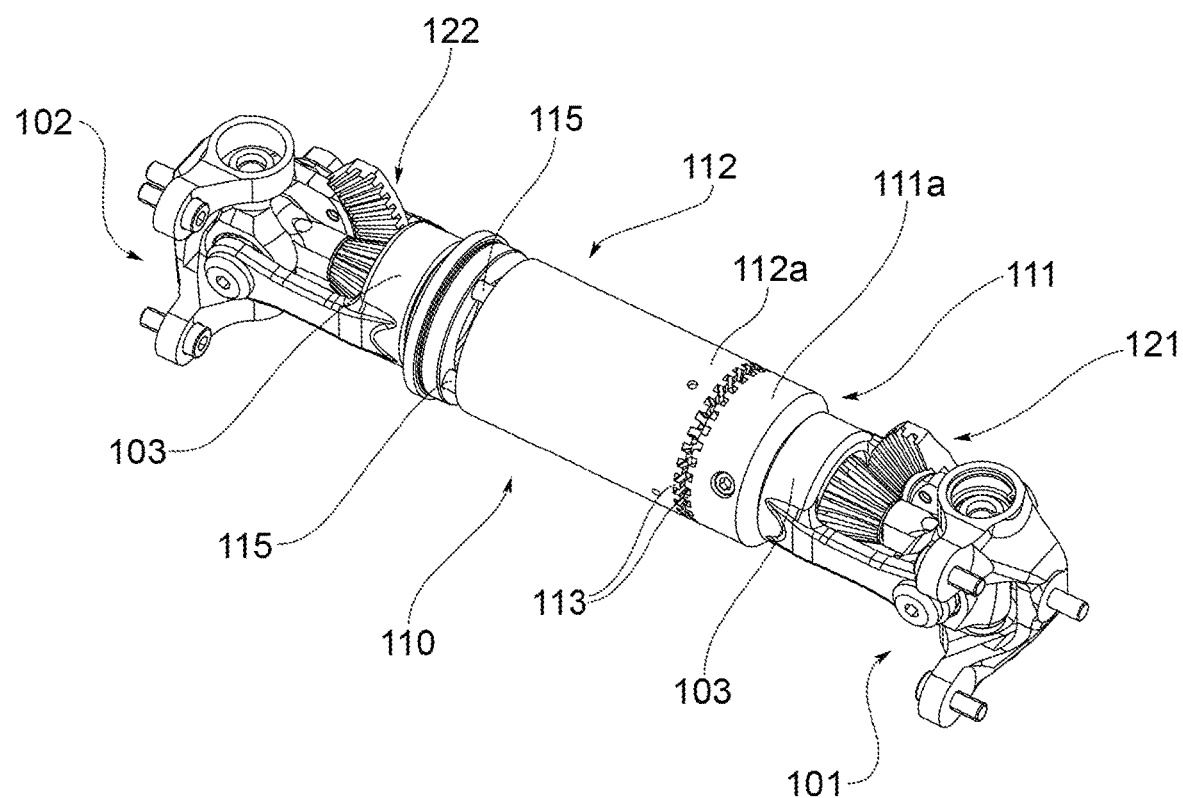

Preferably, at least one of said first 111 and second portion 112 of rod 110 is extensible in the longitudinal direction, so as to allow rod 110 to extend in the longitudinal direction along the longitudinal axis X, as can be seen from a comparison between FIGS. 4 and 5.

Functionally, the extensibility of rod 110 in the longitudinal direction is necessary if rod 110 connects to each other two parts of the forecarriage whose distance may vary, for example as a result of rolling or steering movements of the wheels. In this case, the longitudinal extensibility is necessary to prevent rod 110 from interfering with the manoeuvrability of the motor vehicle.

This is particularly happens when:
rod 110 is placed to connect the axle journals of the two front wheels and is connected thereto out of the respective steering axes; or
rod 110 is placed to connect an upright and a cross member of the articulated quadrilateral kinematic roll mechanism.

Otherwise, if, for example, rod 110 is placed to connect the two uprights of an articulated quadrilateral system of regular shape (such as rectangular), parallel to the two cross members, the rod extensibility is not required. In fact, in this case, the points connected by rod 110 never vary their distance. Similarly, the extensibility is not necessary if the rod connects the two axle journals at the respective steering axes and at the same height with respect to the ground.

Operatively, the extensibility of rod 110 must be implemented in such a way as not to affect the relative axial positioning between said first 111a and second 112a head element. In other words, the two head elements 111a and 112a must be independent of the axial movements due to the possible axial extension of one of the two rod portions 111 and 112. According to the embodiment illustrated in the accompanying Figures, this is achieved by making the axial movements of the second head element 112a independent from those of the second rod portion 112 due to the presence of the above axial sliding pins 115.

More in detail, as shown in particular in FIGS. 8 and 9, the second rod portion 112 is divided into two parts: a proximal one 112', which consists of the second head element 112a, and a distal one 112", which is axially integral with the second transmission means 122. The two parts, proximal 112' and distal 112", are slidably connected to each other in the axial direction via the above axial sliding pins 115. The division into two parts of the second rod portion 112 and the presence of such pins 115 at the same time ensure the axial extensibility of the second portion 112 (and thus of rod 110) and an independent axial positioning of the second head element 112a. The first head element 111a is, instead, axially and rotationally integral with the first portion 111 of rod 110.

Operatively, actuator 130, which is adapted to move the second head element 112a between said blocking position and said release position, is configured to impose a limit to the axial sliding of the second head element 112a with respect to the first head element 111a. Preferably, said actuator 130 is a linear actuator operating along the longitudinal extension axis X of rod 110. In particular, the actuator is of the electrical type.

Advantageously, as illustrated in the accompanying Figures, actuator 130 is installed on rod 110, preferably in a protected position inside the rod itself. To this end, in the embodiment shown in the accompanying figures, the first 111 and the second portion 112 of rod 110 have at least in part a longitudinal tubular cross-section to house inside them said linear actuator 130.

In particular, the linear actuator 130 includes a motor body 131 and an actuator shaft 132, which is movable by the motor body 131 along an axial direction parallel to the longitudinal direction X of rod 110. The motor body 131 is housed inside the second portion 112 of rod 110 and is integral therewith. In particular, the motor body 131 is housed and made integral with the second head element 112a, which as mentioned defines the proximal portion 112' of the second rod portion 112. The actuator shaft 132 is slidably connected at a first end 132' to the motor body 131 and extends axially towards the first portion 111 of said rod 110 to connect to the latter with a second end 132", opposite the first one. In particular, the actuator shaft 132 is connected at the second end 132" thereof to the first head element 111a, integral with the first rod portion 111.

According to an alternative embodiment not illustrated in the accompanying figures, the actuator is not installed on the rod but on another part of the motor vehicle. The operative connection with the head elements 111a and 112a is implemented, for example, via actuation cables. By adopting such a solution, there would be a reduction in weight and dimensions of the rod, but the simplicity of installation would be lost.

Preferably, the stroke of said second head element 112a between the blocking and release positions is fixed. Advantageously, to this end, actuator 130 is configured in such a way that the actuator shaft 132 has a fixed axial stroke, corresponding to the axial stroke of the second head element 112a between the blocking position and the release position.

As will be resumed below, the connection between the second end 132" of the actuator shaft 132 and the first head element 111a can be fixed or elastically yielding in an axial direction. According to the preferred embodiment shown in the accompanying Figures, said first 111a and second head elements 112a are configured to engage each other in blocking by means of an axial front toothed engagement.

Advantageously, each of said first 111a and second head elements 112b comprises a ring gear 113 which extends over an annular surface perpendicular to the longitudinal axis X of rod 110.

Said ring gear 113 has a toothing extending radially with respect to said longitudinal axis X. Preferably, the toothing of said ring gear 113 is straight. A front gear with straight toothing does not substantially involve axial loads. This is advantageous since, once the blocking position has been reached, the role played by the actuator becomes substantially marginal or zero, since the block is substantially all entrusted to the two ring gears. In particular, it is not necessary that the actuator ensures a high degree of mechanical irreversibility in the positioning of the actuator shaft to oppose axial loads that tend to move the two ring gears apart. The absence of axial loads also allows ensuring the maintenance of the blocking position even if accidentally, the actuator is not powered (for example, in the case of power supply battery down).

The drawback associated with the adoption of a straight toothing is linked to a greater difficulty of meshing between the two ring gears and thus a greater slowness in the execution of the block. In fact, if there is not a perfect alignment between the toothing and the grooves of the two ring gears, the coupling cannot take place immediately, but must wait for a relative repositioning between the two toothings generated by the forecarriage movements. It is not, however, a significant functional limitation as any intervention delays would still be very limited and in any event not such as to undermine the intervention effectiveness of the roll blocking action.

Alternatively, the toothing of said ring gears 113 may be triangular teeth. This solution has the advantage of substantially preventing any difficulties of meshing between the ring gears. Such a solution, however, has the drawback that axial loads are generated in the blocking position which tend to move the two gears and which must be opposed by the actuator. This requires sizing the actuator in such a way that it can ensure a higher degree of mechanical irreversibility in the positioning of the actuator shaft and/or the need to maintain the actuator continually active.

It should be noted that an increase in the mechanical irreversibility inevitably leads to an increase in the inertia of the shaft movement, with a consequent reduction in the intervention speed of the actuator. This actually makes it preferable to adopt a straight toothing with respect to a toothing with triangular teeth.

As already mentioned, the adoption of a straight toothing involves the risk of jamming between the teeth of the ring gears of said first 111a and second 112a head element. In such a case, actuator 130 must remain activated until the meshing is completed and the jamming is eliminated and the actuator shaft 132 has completed its axial stroke.

Advantageously, the blocking device can be provided with means for separating the stroke of the actuator shaft 132 from the stroke of the second head element 112a. In this way, the actuator operation is made independent from any jamming between the teeth.

For this purpose, according to the embodiment illustrated in particular in FIGS. 8 and 9, the blocking device 111a, 112a, 130 comprises an elastic means 114 which is interposed between said actuator shaft 132 and the first head element 111a. The interposition of the elastic means is designed to mechanically separate the stroke of the actuator shaft 132 from the stroke of the second head element 112a and allow the actuator shaft 132 to arrive at the stroke end in the transition from the release position to the blocking position by elastically compressing the elastic means 114, in the case where the meshing between the two head elements 111a, 112a is temporarily prevented due to a jamming between the teeth.

The elastic means 114 is positioned and configured in such a way that, once elastically compressed, it can elastically push in the axial direction the second head element 112a towards the first head element 110a to bring the second head element 112a at the stroke end in the blocked position, completing the meshing. The thrust of the elastic means 114 can be released after the jamming between the teeth has been eliminated, for example, by a mutual rotational repositioning of the two ring gears 113 following a minimum variation of the rolling angle.

Preferably, said elastic means 114 is a mechanical spring.

More in detail, as illustrated in FIGS. 8 and 9 and in FIG. 16, the second end 132" of the actuator shaft 132 is coupled to a bushing 133 which, in turn, is coaxially associated to the first head element 111a via a ball bearing 134. The ball bearing 114 ensures to bushing 133 and the associated actuator shaft 132 freedom of axial sliding and rotation with respect to the longitudinal axis X. Bushing 133 is provided with a first annular projection 135 which acts as a stop for the axial sliding of the bushing with respect to the ball bearing 134. The above elastic means 114, consisting of a mechanical spring, is coaxially fitted around bushing 133 and is positioned between the ball bearing 134 and a second annular projection 136 formed on the bushing, in an axial position opposite to the first annular projection 135. The mechanical means 114 keeps bushing 133 with the annular projection 135 abutting against the ball bearing 134, as shown in FIG. 16B.

Operatively, actuator 130, when actuated to bring the second head element 112a from the release position to the blocking one, exerts an axial traction on shaft 132 and on the associated bushing 133, which would tend to bring bushing 133 out of bearing 134 by moving the first annular projection 135 away from the abutment. Such action is counteracted by spring 114. In the absence of jamming between the teeth, the resistance exerted by spring 114 is greater than the axial sliding frictions between the two head elements. The traction exerted by the actuator in the axial direction thus causes the movement of the second head element 112a towards the first head element 111a, instead of the axial movement of bushing 133 and the associated actuator shaft 132. In contrast, in the presence of jamming between the teeth, the resistance exerted by spring 114 is smaller than the axial sliding frictions between the two head elements. Therefore, the traction exerted by the actuator in the axial direction causes the axial movement of bushing 133 and the associated actuator shaft 132 with the compression of spring 114 (as shown in FIG. 16A), while the displacement of the second head element 112a towards the first head element 111a remains prevented (although temporarily). In such a situation, actuator 130 can still arrive at the end of stroke, compressing spring 114. In the moment in which the jamming between the teeth is eliminated, spring 114 can release its elastic load bringing bushing 133 in abutment against bearing 134 but dragging therewith the associated shaft 132 and thus also the second head element 111a through the motor body 131.

Advantageously, the multiplication of the motion obtained due to the transmission means with a transmission ratio greater than 1 and the presence of the elastic means 114 (mechanical delay spring) make the discretization of the blocking positions linked to the number of teeth of the front gears imperceptible, whereby the driver will perceive the block as continuous, that is, able to operate for any rolling lying of the motor vehicle.

According to the alternative embodiment not shown in the accompanying Figures, said first 111a and second head elements 112a are configured to engage each other in blocking by means of a friction engagement, with a configuration similar to a clutch.

Advantageously, the blocking device 111a, 112a, 130 may comprise a sensor (not illustrated in the accompanying Figures) which is electrically connected to a control unit and is adapted to detect when the second head element 112a is in the blocking position.

Preferably, said sensor consists of a microswitch which is associated with one of said first 111a and second head elements 112a and is engageable by the other head element, when the second head element 112*a* is in the blocking position. In this way, the achievement of said blocking position is detectable in a precise and reliable manner by an electronic control system of the motor vehicle in charge of the control of the roll block system.

According to a general embodiment of the invention, it is provided a forecarriage of a rolling motor vehicle with three or four wheels, comprising:
- a forecarriage frame 16,
  - at least a pair of front wheels 10',10" kinematically connected to each other and to the forecarriage frame 16 by means of a kinematic roll mechanism 20,
  - a roll block system 100 comprising
  - a rod 110 which directly connects to each other two parts of the forecarriage, at least one of said parts being subject to roll movements,
    - wherein said rod 110 comprises a first portion 111 of rod and a second portion 112 of rod kinematically connected to said two parts of the forecarriage by transmission means 121, 122 suitable to convert a rotation movement around an axis perpendicular to a roll plane into a rotation movement of the respective rod portion 111, 112 around to a longitudinal extension axis X;
    - a blocking device 111*a*, 112*a*; 130 suitable to block the relative rotation of said first portion 111 of rod and of said second portion 112 of rod between: a blocking position, in which said first 111 and second portion 112 of rod are rotationally integral to block the angle of rotation of said rod with respect to said rolling plane, and a release position, in which said first 111 and second portion 112 of rod are free to rotate around to said longitudinal extension axis X to allow the rotation of said rod 110 with respect to said rolling plane.

According to a preferred embodiment of the invention, it is provided a forecarriage of a rolling motor vehicle with three or four wheels, comprising:
- a forecarriage frame 16,
  - at least a pair of front wheels 10',10" kinematically connected to each other and to the forecarriage frame 16 by means of a kinematic roll mechanism 20,
  - a roll block system 100 comprising
  - a rod 110 which directly connects to each other two parts of the forecarriage, at least one of said parts being subject to roll movements,
    - wherein said rod 110 comprises a first portion 111 of rod and a second portion 112 of rod kinematically connected to said two parts of the forecarriage by transmission means 121, 122 suitable to convert a rotation movement around an axis perpendicular to a roll plane into a rotation movement of the respective rod portion 111, 112 around to a longitudinal extension axis X, the transmission means 121,122 being configured so that said first 111 and second portion 112 of rod rotate axially in opposite directions to each other;
    - wherein said blocking device 111*a*, 112*a*; 130 comprises on each of said first 111 and second portions 112 a respective first 111*a* and second head element 112*a*, arranged facing each other
    - said second head element 112*a* being movable along the longitudinal extension axis X to move between a blocking position, in which it engages in reciprocal blocking said first head element 111 so as to make said first 111 and second portion 112 of rod rotationally integral, and a release position in which said second head element 112*a* is uncoupled from said first head element 111*a* so as to leave said first 111 and second portion 112 of rod free to rotate, said blocking device 111*a*, 112*a*; 130 comprising an actuator 130 suitable to move said second head element 112*a* between said blocking position and said release position. According to a particular embodiment of the invention, it is provided a forecarriage 8 of a rolling motor vehicle with three or four wheels, comprising:
- a forecarriage frame 16,
  - at least a pair of front wheels 10',10" kinematically connected to each other and to the forecarriage frame 16 by means of a kinematic roll mechanism 20 which enables the same to roll in a synchronous and specular manner,
  - a roll block system 100 comprising a rod 110 which directly connects to each other at their two ends by means of ball joints or equivalent hinging means to ball joints 101, 102, two parts of the forecarriage both subject to roll movements of said two front wheels or said forecarriage frame 16 and a part of the forecarriage subject to said roll movements, said roll block system comprising a blocking device 111*a*, 112*a*; 130 suitable to block the angle of rotation of said rod at both its ends with respect to a rolling plane of said forecarriage, wherein said rod 110 comprises a first portion 111 of rod and a second portion 112 of rod, which are interconnected with each other along a longitudinal extension axis X of said rod 110 and can each rotate around said longitudinal extension axis X independently of one another, said first 111 and second portion 112 of said rod 110 being kinematically connected to the respective ball joint 101, 102 by transmission means 121, 122 suitable to convert a rotation movement of the ball joint 101, 102 around an axis perpendicular to said roll plane into a rotation movement of the respective rod portion 111, 112 around said longitudinal extension axis X, the transmission means 121, 122 of said first 111 and second portion 112 of rod being configured so that said first 111 and second portion 112 of rod rotate axially in opposite directions to each other in the presence of roll movements of the forecarriage, said transmission means 121, 122 having a transmission ratio of not less than 1,
    and wherein said blocking device 111*a*, 112*a*; 130 comprises on each of said first 111 and second portion 112 a respective first 111*a* and second head element 112*a*, wherein said first 111*a* and second head element 112*a* are rotationally integral with the respective first 111 and second portion 112 of rod, and wherein said first 111*a* and second head element 112*a* are arranged facing each other, said second head element 112*a* of said second portion 112 of rod being movable along the longitudinal extension axis X of the rod 110 to move between a blocking position, in which said second head element 112*a* engages in reciprocal blocking said first head element 111 so as to make said first 111*a* and second portion 112 of rod rotationally integral, prevent the rotation thereof and thus block the rolling movements by means of said transmission means 121, 122, and a release position, in which said second head element 112*a* is longitudinally separate from said first head element 111*a* so as to leave said first 111 and second portion 112 of rod free to rotate without interfering on the roll movements, said blocking device 111*a*, 112*a*; 130 comprising an actuator 130 suitable to move said second head element 112*a* between said blocking position and said release position.

An object of the present invention is also a method of reversibly blocking the rolling movements of a motor vehicle with three or four wheels, having a forecarriage 8 according to the present invention and in particular as described above.

Said method comprises, in alternation:
- a roll blocking step, wherein said blocking device 111a, 112a; 130 is active to block the relative rotation of said first portion 111 of rod and of said second portion 112 of rod so as to make them rotationally integral, and to block the angle of rotation of said rod with respect to said rolling plane, and
- a roll release step, wherein said blocking device 111a, 112a; 130 is inactive to allow said first portion 111 and said second portion 112 of rod rotating one to each other and to allow the rotation of said rod 110 with respect to said rolling plane.

More in particular, the above method comprises, in alternation:
- a roll blocking step, wherein actuator 130 is activated to move the second head element 112a from said release position to said blocking position, so as to make the first 111 and second rod portion 112 rotationally integral, prevent the rotation thereof and thus block the rolling movements by means of said transmission means 121, 122; and
- a roll release step, wherein actuator 130 is activated to move the second head element 112a from the blocking position to the release position, wherein said first 111 and second rod portion 112 of rod are longitudinally separate from each other so as to leave them free to rotate without interfering on the roll movements.

An object of the present invention is also a motor vehicle 4 having a drive wheel at the rear and a forecarriage 8 according to the present invention and in particular as described above. The object of the present invention is also a roll block system for a forecarriage of a rolling motor vehicle with three or four wheels, according to the present invention and in particular as described above separated from the forecarriage, as defined in the appended claim 17. According to a preferred embodiment of the invention, the roll block system 100 comprises: a rod 110 which is destined—in the installed condition on said forecarriage 8—to connect directly to each other two parts of the forecarriage 8, at least one of said parts being subject to roll movements, wherein said rod 110 comprises a first portion 111 of rod and a second portion 112 of rod kinematically connected to said two parts of the forecarriage by transmission means 121, 122 suitable to convert a rotation movement around an axis perpendicular to a roll plane into a rotation movement of the respective rod portion 111, 112 around to a longitudinal extension axis X, the transmission means 121,122 being configured so that said first 111 and second portion 112 of rod rotate axially in opposite directions to each other;

wherein said blocking device 111a, 112a; 130 comprises on each of said first 111 and second portions 112 a respective first 111a and second head element 112a, arranged facing each other, said second head element 112a being movable along the longitudinal extension axis X to move between a blocking position, in which it engages in reciprocal blocking said first head element 111 so as to make said first 111 and second portion 112 of rod rotationally integral, and a release position in which said second head element 112a is uncoupled from said first head element 111a so as to leave said first 111 and second portion 112 of rod free to rotate, said blocking device 111a, 112a; 130 comprising an actuator 130 suitable to move said second head element 112a between said blocking position and said release position. According to a particular embodiment of the invention, it is provided a roll block system 100 of a forecarriage 8 of a rolling motor vehicle with three or four wheels, wherein said forecarriage 8 comprises:—a forecarriage frame 16; and—at least a pair of front wheels 10',10" kinematically connected to each other and to the forecarriage frame 16 by means of a kinematic roll mechanism 20 which enables the same to roll in a synchronous and specular manner, said roll block system 100 comprising a rod 110 which is destined—in the installed condition on said forecarriage 8—to connect directly to each other at their two ends, by means of ball joints or hinging means equivalent to ball joints 101, 102, two parts of the forecarriage 8 both subject to roll movements of said two front wheels or said forecarriage frame 16 and a part of the forecarriage 8 subject to said roll movements, wherein said roll block system 100 comprises a blocking device 111a, 112a; 130 suitable to block the angle of rotation of said rod 110 at its two ends with respect to a rolling plane of said forecarriage 8, wherein that said rod 110 comprises a first portion 111 of rod and a second portion 112 of rod, which are interconnected with each other along a longitudinal extension axis X of said rod and can each rotate around said longitudinal extension axis X independently of one another, and wherein said roll block system 100 comprises on said first 111 and second portion 112 of said rod 110 transmission means 121, 122, which are intended to kinematically connect said first 111 and second portion of rod 112 to the respective ball joint 101,102 and are suitable to convert a rotation movement of the ball joint 101, 102 around an axis substantially perpendicular to said roll plane into a rotation movement of the respective rod portion 111, 112 around said longitudinal extension axis X, wherein the transmission means 121,122 of said first 111 and said second portion 112 of rod are configured so that said first 111 and second portion 112 of rod rotate axially in opposite directions to each other in the presence of roll movements of the forecarriage 8, said transmission means 121, 122 having a transmission ratio of not less than 1, and wherein said blocking device 111a, 112a; 130 comprises on each of said first 111 and second portions 112 of rod a respective first 111a and second head element 112a, wherein said first 111a and second head elements 112a are rotationally integral with the respective first 111 and second portion 112 of rod, and wherein said first 111a and second head elements 112a are arranged facing each other, said second head element 112a of said second portion of rod 112 being movable along the longitudinal extension axis X of the rod 110 to move between a blocking position, in which said second head element 112a engages in reciprocal blocking said first head element 111 so as to make said first 111 and second portion 112 of rod rotationally integral, prevent the rotation thereof and thus block the rolling movements by means of said transmission means 121, 122, and a release position in which said second head element 112a is longitudinally separate from said first head element 111a so as to leave said first 111 and second portion 112 of rod free to rotate without interfering on the roll movements, wherein said blocking device 111a, 112a; 130 comprises an actuator 130 suitable to move said second head element 112a between said blocking position and said release position.

The invention allows several advantages to be achieved, some of them already described. The rolling block system according to the invention therefore allows combining the simple installation of a rod as a roll blocking element with a small footprint of the system as a whole. It is in fact possible to use actuators having a significantly smaller size than those required by traditional systems. The size reduction of the actuators has as a consequence not only a reduction of the overall dimensions, but also of costs.

In the specific case in which rod 110 is placed to connect the axle journals of the two front wheels 10', 10", the roll block system according to the invention further allows symmetrizing the roll blocking of both front rolling wheels without requiring any duplication of the blocking devices and thus without causing an increase in the overall dimensions of the system and the related costs.

The roll block system according to the invention is also constructionally simple and cost-effective to produce and mount on the motor vehicle itself.

The invention thus conceived thus achieves the intended purposes. Of course, it may take, in its practical embodiment, also shapes and configurations other than the above without departing from the present scope of protection.

Furthermore, all details may be replaced with technically equivalent elements and dimensions, shapes and materials used may be any according to the needs.

The invention claimed is:

1. Forecarriage of a rolling motor vehicle with three or four wheels, comprising:
    a forecarriage frame,
    at least a pair of front wheels kinematically connected to each other and to the forecarriage frame by means of a kinematic roll mechanism,
    a roll block system comprising a rod which directly connects to each other two parts of the forecarriage, at least one of said parts being subject to roll movements, wherein said rod comprises a first portion of rod and a second portion of rod kinematically connected to said two parts of the forecarriage by transmission means suitable to convert a rotation movement around an axis perpendicular to a roll plane into a rotation movement of the respective rod portion around to a longitudinal extension axis;
    wherein said roll block system comprises a blocking device suitable to block the relative rotation of said first portion of rod and of said second portion of rod between a blocking position, in which said first and second portion of rod are rotationally integral to block the angle of rotation of said rod with respect to said rolling plane, and a release position, in which said first and second portion of rod are free to rotate around to said longitudinal extension axis to allow the rotation of said rod with respect to said rolling plane.

2. Forecarriage according to claim 1, wherein the transmission means of said first and second portion of rod are configured so that said first and second portion of rod rotate axially in opposite directions to each other.

3. Forecarriage according to claim 1, wherein said blocking device comprises on each of said first and second portion a respective first and second head element, arranged facing each other, said second head element being movable along the longitudinal extension axis to move between a blocking position, in which engages in reciprocal blocking said first head element so as to make said first and second portion of rod rotationally integral, and a release position, in which said second head element is longitudinally uncoupled from said first head element so as to leave said first and second portion of rod free to rotate, said blocking device comprising an actuator suitable to move said second head element between said blocking position and said release position.

4. Forecarriage according to claim 1, wherein said rod directly connects to each other at their two ends by means of ball joints or equivalent hinging means to ball joints said two parts of the forecarriage.

5. Forecarriage according to claim 1, wherein said transmission means have a transmission ratio greater than 1, so as to have a multiplication of the motion from the ball joints to the respective first and second portion of said rod.

6. Forecarriage according to claim 3, wherein said first and second head elements are shaped like a collar or a flange coaxial to the respective portion of rod.

7. Forecarriage according to claim 1, wherein said transmission means comprise, for each of the two first and second portion of rod, a helical-bevel gear pair.

8. Forecarriage according to claim 3, wherein said second head element is mounted axially sliding in the longitudinal direction with respect to the second portion (112) of rod.

9. Forecarriage according to claim 3, wherein said actuator is a linear actuator operating along the longitudinal extension axis of the rod.

10. Forecarriage according to claim 9, wherein said linear actuator comprises an actuator shaft which axially connects in the longitudinal direction said first and second head elements to each other and is movable in the longitudinal direction in a fixed axial stroke which substantially corresponds to the fixed stroke of said second head element between the blocking and release positions.

11. Forecarriage according to claim 3, wherein said first and second head elements are configured to engage each other in blocking by means of an axial front toothed engagement.

12. Forecarriage according to claim 11, wherein each of said first and second head elements comprises a ring gear which extends over an annular surface perpendicular to the longitudinal axis of the rod, and wherein said ring gear has a toothing extending radially with respect to said longitudinal axis, in particular the toothing of said ring gear being straight.

13. Forecarriage according to claim 10, wherein said first and second head elements are configured to engage each other in blocking by means of an axial front toothed engagement and wherein said blocking device comprises an elastic means which is interposed between said actuator shaft and said first head element in order to mechanically separate the stroke of said actuator shaft from the stroke of said second head element and to allow said actuator shaft to reach the end stroke in the passage from said release position to said blocking position elastically compressing said elastic means, in the case in which the engagement between the two head elements is temporarily prevented due to a jamming between the teeth, and wherein, once elastically compressed, said elastic means are suitable to elastically push in the axial direction said second head element towards said first head element to bring said second head element to the end stroke in the blocking position, after the jamming between the teeth has been eliminated.

14. Forecarriage according to claim 3, wherein the blocking device comprises a sensor electrically connected to a control unit suitable to detect when said second element head is in the blocking position.

15. Method of reversibly blocking the rolling movements of a motor vehicle with three or four wheels, having a forecarriage according to claim 1, said method alternately comprising:
    a roll blocking step, wherein said blocking device is active to block the relative rotation of said first portion of rod and of said second portion of rod so as to make them rotationally integral, and to block the angle of rotation of said rod with respect to said rolling plane, and
    roll release step, wherein said blocking device is inactive to allow said first portion and said second portion of rod rotating one to each other and to allow the rotation of said rod with respect to said rolling plane.

16. Motor vehicle having a drive wheel at the rear axle and a forecarriage according to claim 1.

17. Roll block system of a forecarriage of a rolling motor vehicle with three or four wheels, wherein said forecarriage comprises:

a forecarriage frame; and at least a pair of front wheels kinematically connected to each other and to the forecarriage frame by means of a kinematic roll mechanism, said roll block system comprising a rod which is destined—in the installed condition on said forecarriage—to connect two parts of the forecarriage, at least one of said parts being subject to roll movements, wherein said rod comprises a first portion of rod and a second portion of rod kinematically connected to said two parts of the forecarriage by transmission means suitable to convert a rotation movement around an axis perpendicular to a roll plane into a rotation movement of the respective rod portion around to a longitudinal extension axis;

said roll block system comprising a blocking device suitable to block the relative rotation of said first portion of rod and of said second portion of rod between a blocking position, in which said first and second portion of rod are rotationally integral to block the angle of rotation of said rod with respect to a rolling plane, and a release position, in which said first and second portion of rod are free to rotate around to said longitudinal extension axis to allow the rotation of said rod with respect to said rolling plane.

\* \* \* \* \*